(12) United States Patent
Freeman et al.

(10) Patent No.: US 6,408,185 B1
(45) Date of Patent: Jun. 18, 2002

(54) METHOD AND SYSTEM FOR MODELING A RADIO COMMUNICATIONS NETWORK

(75) Inventors: David Freeman, Billerica; Pete A. Boyer, Somerville; Pablo Vicharelli, Carlisle, all of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/534,903

(22) Filed: Mar. 23, 2000

(51) Int. Cl.[7] ................................................. H04B 7/00
(52) U.S. Cl. ........................ 455/446; 455/449; 455/422; 455/67.6
(58) Field of Search ................................ 455/403, 422, 455/446, 449, 507, 67.6

(56) References Cited

U.S. PATENT DOCUMENTS 5,726,984 A * 3/1998 Kubler et al. .................. 379/59
5,805,807 A * 9/1998 Hanson et al. ................. 370/32
6,006,100 A * 12/1999 Koenck et al. ............. 455/466
6,021,331 A * 2/2000 Cooper et al. .............. 455/507

* cited by examiner

Primary Examiner—Thanh Cong Le
Assistant Examiner—Thuan T. Nguyen
(74) Attorney, Agent, or Firm—Leonard Charles Suchyta; James K. Weixel

(57) ABSTRACT

In a radio communications network (20) having a plurality of cells (34) employing a plurality of cell site configurations (22, 24, 26, 28, 30, and 32), a computing system (116) and a computer-based method (178) create a hierarchical data structure (136) modeling the radio communications network (20). The hierarchical data structure (136) is created using object oriented programming methodology to create objects, representing the various physical components of a cell site. In addition, objects are created to represent the auxiliary information, such as available channels, channel assignment constraints, carrier-to-interference ratios, and neighbors lists under which a particular radio communications network configuration is devised.

38 Claims, 26 Drawing Sheets

```
class radioPlan {
    private:
        site *pFirstSite;              //point to the first site in the plan
    public:
        // constructor
        radioPlan(void)
        {
            pFirstSite = NULL;         //no site in the plan when constructed
        }
        // destructor
        ~radioPlan(void)
        {
            site *pSite = pFirstSite;  //loop over all sites in the plan
            while (pSite != NULL)
            {
                site *pNext = pSite->pNextSite;   //remember the next site
                delete pSite;                      //and destroy the current one
                pSite = pNext;
            }
        }
        //support looping over all sites in the radio plan
        site *getFirstSite(void)       { return pFirstSite; }
        site *getNextSite(site *pSite) { return pSite-> pNextSite; }
    friend void site::site(radioPlan *pParent);
    friend void site::~site(void);
};
```

144 points to constructor; 146 points to destructor; label 142 refers to the code block.

FIG. 8

```
class site {
    private:
        radioPlan *pParentRadioPlan;            //point to parent radio plan
        site *pNextSite;                        //point to the next site in the linked list
        sector *pFirstSector;                   //point to the first sector of the site
        double latitude;
        double longitude;                       //location of the site
    public:
        //constructor
        site (radioPlan *pParent)
        {
            pParentRadioPlan = pParent;                 //link site to radio plan
            pNextSite = pParentRadioPlan->pFirstSite;
                                                        //point to previous first site
            pParentRadioPlan->pFirstSite = this;
                                                        //this site is the new first site
            pFirstSector = NULL;        //no sector at the site when constructed
        }
        //destructor
        ~site (void)
        {
            //remove the site from the linked list in the radio plan
            site *pHere = pParentRadioPlan->pFirstSite;
            if (pHere == this)                          //if this site is the first in the list
                pParentRadioPlan->pFirstSite = pNextSite;   //...just point past it
            else
            {
                site *pNext = pHere->pNextSite;         //scan for the site
                while (Next != this)                    //...linked to this site
                {
                    pHere = pNext;
                    pNext = pHere->pNextSite;
                }
                pHere->pNextSite = pNextSite;           //point past this site
            }
            sector *pSector = pFirstSector;             //scan all sectors
            while (pSector != NULL)
            {
                sector *pNext = pSector->pNextSector;
                                                        //remember the next sector
                delete pSector:                         //and destroy the current one
                pSector = pNext;
            }
        {
        //find the plan to which the site belongs
        radioPlan *getParent(site *pSite) { return pParentRadioPlan; }
        //support looping over all sectors at the site
        site *getFirstSector(void) ;            { return pFirstSector; }
        site *getNextSector (site *pSector) ; { return pSector->pNextSector;}
        friend site *radioPlan::getNextSite(site *pSite);
        friend void sector::sector(site *pParent, channelTable *pChTbl);
        friend void sector::~ sector(void) ;
        friend void cellAntenna::cellAntenna(group * pParent, antenna
            *pThisAntenna, double mountHeight) ;
};
```

FIG. 9

```
class sector {
    private:
        site *pParentSite;                              //point to parent site
        site *pNextSector;                              //point to next sector in linked list
        sector *pFirstGroup;                            //point to first group of sector
        channelTable *pChannelTable                     //point to channel table for sector
    public:
        //constructor
        sector (site *pParent, channelTable *pChTbl =
                &templateChannelTable)
        {
            pParentSite = pParent;                      //link sector to site
            pNextSector = pParent->pFirstSector;
                                                        //point to previous first sector
            pParent->pFirstSector = this;
                                                        //this sector is new first sector
            pFirstGroup = NULL;                         //no group in sector when constructed
            pChannelTable = pChTbl;                     //link sector to a channel table
        }
        //destructor
        ~sector(void)
        {
            //remove the sector from the linked list in the site
            sector *pHere = pParentSite->pFirstSector;
            if (pHere == this)                          //if this sector is the first in the list
                pParentSite->pFirstSector = pNextSector;   //...just point past it
            else
            {
                sector *pNext = pHere->pNextSector;     //scan for the sector
                while (Next != this)                    //...linked to this sector
                {
                    pHere = pNext;
                    pNext = pHere->pNext;
                }
                pHere->pNextSector = pNextSector;       //point past this sector
            }
            group *pGroup = pFirstGroup;                //scan all groups
            while (pGroup !=NULL
            {
                group *pNext = pGroup->pNextGroup;  //remember the next group
                delete pGroup;                          //and destroy the current one
                pSector = pNext;
            }
        }
        {
        //find the site to which the sector belongs
        Site *getParent(void) ;         { return pParentSite; }
        //support looping over all groups in the sector
        group *getFirstGroup(void)  { return pFirstGroup; }
        group *getNextGroup(group *pGroup)
            { return pGroup->pNextSectorGroup; }
        //find the channel table for the sector
        channelTable *getChannelTable(void) { return pChannelTable; }
        friend sector *site::getNextSector(sector *pSector);
        friend void sector::sector(site *pParent, channelTable *pChTbl);
        friend void group::group(sector *pParentSec, plane *pParentPl);
        friend void group::~group(void);
};
```

FIG. 10

```
class group {
    private:
        int index;                            //index for matrices
        sector *pParentSector;                //point to parent sector
        group *pNextSectorGroup;              //point to next group in sector
        plane *pParentPlane;                  //point to parent technology plane
        group *pNextGroup;                    //point to next group in plane
        TRX *FirstTRX;                        //point to first TRX of group
        CellAntenna *pFirstCellAntenna;       //point to first cell antenna of group
    public:
        //constructor
        group (sector *pParentSec, plane *pParentPl
        {
            pParentSector = pParentSec;       //link group to sector
            pParentPlane = pParentPl;         //link group to technology plane
            pFirstGroup = NULL;               //no group in plane when constructed
            pFirstCellAntenna = NULL          //no cell antenna when constructed
        }
        //destructor
        ~group(void)
        {
            //remove the group from the linked list in the sector
            group *pHere = pParentSector->pFirstGroup;
            if (pHere == this)                //if this group is the first in the list
                pParentSector->pFirstGroup = pNextSectorGroup;
                                              //...just point past it
            else
            {
                group *pNext = pHere->pNextSectorGroup;   //scan for group
                while (pNext != this)                     //...linked to this group
                {
                    pHere = pNext;
                    pNext = pHere->pNextSectorGroup;
                }
                pHere->pNextSectorGroup = pNextSectorGroup;
                                              //point past this group
            }
            //remove group from linked list in technology plane
            pHere = pParentPlane->pFirstGroup;
            if (pHere == this)                //if this group is first in list
                pParentPlane->pFirstGroup = pNextGroup;   //...just point past it
            else
            {
                group *pNext = pHere->pNextSectorGroup;   //scan for group
                while (pNext != this)                     //...linked to this group
                {
                    pHere = pNext;
                    pNext = pHere->pNextSector;
                }
                pHere->pNextGroup = pNextGroup;   //point past this sector
            }
        }
```

FIG. 11A

```
        TRX *pTRX = pFirstTRX;                    //scan all TRXs in plane
        while (pTRX!=NULL)
        {
            group *pNext = pTRX->pNextTRX;        //remember next TRX
            delete pTRX                            //and destroy the current one
            pTRX = pNext;
        }
    }
    //find the sector to which this TRX belongs
    site *getParentSector(void);        { return pParentSector; }
    //find the technology plane to which this TRX group belongs
    plane *getParentPlane(void)         { return pParentPlane; }
    //support looping over all TRXs in this TRX group
    TRX *getFirstTRX(void)              { return pFirstTRX; }
    TRX *getNextTRX(TRX *pTRX)          { return pTRX->pNextTRX; }
    //support looping over all cell antennas in this TRX group
    cellAntenna *getFirstCellAntenna(void)
            { return pFirstCellAntenna; }
    cellAntenna *getNextCellAntenna(CellAntenna *pCellAntenna)
            { return pCellAntenna->pNextCellAntenna; }
    //get the matrix index for this TRX group
    int getIndex(void)      { return index; }
  friend group *sector::getNextGroup(group *pGroup);
  friend group *plane::getNextGroup(group *pGroup);
  friend void TRX::TRX(group *pParent, channel *pChan, padlock
      lockstat);
  friend void TRX::~TRX(void);
  friend void cellAntenna::cellAntenna(group *pParent, antenna
      *pThisAntenna, double mountHeight);
  friend void cellAntenna::~cellAntenna(void);
};
```

```
enum padlock {LOCKED, UNLOCKED}                    //locked-down status
padlock toggle (padlock state)
{
    switch (state)
    {
        case LOCKED:
            return UNLOCKED;
            break;
        case UNLOCKED:
            return LOCKED;
            break;
        default:                                    //this should never happen
            return UNLOCKED;
    }
}
typedef ctoi_t double;                              //C/I type
    class TRX {
    private:
        group *pParentGroup;                        //point to parent TRX group
        group *pNextTRX;                            //point to next TRX in group
        channel *pChannel;                          //point to the logical channel for the TRX
        padlock lockStatus;                         //is TRX locked or unlocked?
        ctoi_t cochanCtoI;
        ctoi_t adjacent CtoI;
        ctoi_t cochanCoColorCtoI;
        ctoi_t adjacentCoColorCtoI;
    public:
        //constructor
        TRX (group *pParent, channel *pChan = NULL, padlock
            lockStat = UNLOCKED)
        {
            pParentGroup = pParent;                 //link TRX to TRX group
            pNextTRX - pParentGroup->pFirstTRX;
                                                    //point to previous first TRX
            pParentGroup->pFirstTRX = this;         //this site is the new first TRX
            pChannel = pChan;                       //link TRX to logical channel
            lockStatus - lockStat;                  //set locked/unlocked status
        }
        //destructor
        ~TRX(void)
        {
            //remove the TRX from the linked list in the group
            TRX *pHere = pParentGroup->pFirstTRX;
            if (pHere == this)                      //if this TRX is the first in the list
                pParentGroup->pFirstTRX = pNextTRX; //...just point past it
            else
            {
                TRX *pNext = pHere->pNextTRX;       //scan for TRX
                while (pNext != this)               //...linked to this TRX
                {
                    pHere = pNext;
                    pNext = pHere->pNextTRX;
                }
                pHere->pNextTRX = pNextTRX;         //point past this TRX
            }
        }
```

FIG. 12A

```
//find the TRX group to which this TRX belongs
group *getParent(void) ;           { return pParentGroup; }
//read the locked/unlocked status
padlock getLockStatus(void)    { return lockStatus; }
toggle the locked/unlocked status
void toggleLockStatus(void)    { lockStatus = switch (lockStatus); }
//support channel assignments
int isAssigned(void)           //test if a channel is assigned to TRX
{
    if (channel == NULL)
        return 0
    else
        return 1
}
void assignChannel (channel *pChan)    { pChannel = pChan; }
//support total C/I data of various types
ctoi_t readCochanCtoi (void)    { return cochanCtoi; }
void writeCochanCtoi (ctoi_t value)    { return cochanCtoi = value; }
ctoi_t readAdjacentCtoi (void)    { return adjacentCtoi; }
void writeAdjacentCtoi (ctoi_t value)
    { return adjacentCtoi = value; }
ctoi)_t readCochanCocolorCtoi(void)    { return cochanCocolorCtoi; }
void writeCochanCocolorCtoi (ctoi_t value)
    { return cochanCocolorCtoi = value; }
ctoi_t readAdjacentCocolorCtoi(void)
    { return adjacentCocolorCtoi; }
void writeAdjacentCocolorCtoi(ctoi_t value)
    { return adjacentCocolorCtoi = value; }
friend TRX *group::getNextTRX(TRX *pTRX);
};
```

```
    class cellAntenna {
private:
    group *pParentGroup;                    //point to parent TRX group
    cellAntenna *pNextCellAntenna;          //point to next antenna for group
    antenna *pAntenna;                      //point to antenna model
    double latitude;                        //location parameters
    double longitude;
    double height;                          //mounting height
    double boresight;                       //orientation of antenna
    double tilt;                            //tilt of antenna
                                            //plus additional antenna parameters
public:
    //constructor
    cellAntenna(group *pParent, antenna *pThisAntenna, double
        mountHeight)
    {
        pParentGroup = pParent;             //link antenna to TRX group
        pNextCellAntenna = pParentGroup->pFirstCellAntenna;
                                            //point to previous first antenna
        pParentGroup->pFirstCellAntenna = this;
                                            //this antenna is the new first antenna
        pAntenna = pThisAntenna;            //link antenna to its model
        height = mountHeight;               //set mounting height of antenna
        //set default location of antenna
        latitude = ((pParentGroup->getParentSector())
                ->getParent())->latitude;
        longitude = ((pParentGroup->getParentSector())
                ->getParent())->longitude;
    }
    //destructor
    ~cellAntenna(void)
    {
        //remove the antenna from the linked list in the TRX group
        cellAntenna *pHere = pParentGroup->pFirstCellAntenna;
        if (pHere == this)          //if this antenna is the first in the list
            pParentGroup->pFirstAntenna = pNextCellAntenna;
                                            //...just point past it
        else
        {
            cellAntenna *pNext = pHere->pNextCellAntenna;
                                            //scan for antenna
            while (pNext != this)           //...linked to this antenna
            {
                pHere = pNext;
                pNext = pHere->pNextCellAntenna;
            }
            pHere->pNextCellAntenna = pNextCellAntenna;
                                            //point past this antenna
        }
    }
    //find the TRX group to which this cell antenna belongs
    group *getParent (void);        { return pParentGroup; }
friend cellAntenna *group::getNextCellAntenna
    (cellAntenna *pCellAntenna);
};
```

```
class plane {
private:
    technology_t technology;        //particular technology type of plane
    radioPlan *pParentplan;                    //point to parent radio plan
    sector *pFirstGroup;                       //point to first group of plane
    constraint *pConstraint         //point to constraint matrix for plane
    ctoi *pCtoI                     //point to pairwise C/I matrix for plane
public:
    // constructor
    plane (radioPlan *pParent, technology_t thisTechnology)
    {
        switch (technology)
        {
            case AMPS_TRAFFIC:
                if (pParentPlan->pTrafficPlane != NULL)
                    return;
                pParentPlan->pTrafficPlane = this;
                break;
            case AMPS_CONTROL:
                if (pParentPlan->pControlPlane != NULL)
                    return;
                pParentPlan->pControlPlane = this;
                break;
            case CDMA:
                if (pParentPlan->pTrafficPlane != NULL)
                    return;
                pParentPlan->pTrafficPlane = this;
                break;
            case TDMA:
                if (pParentPlan-> pControlPlane != NULL)
                    return;
                pParentPlan-> pControlPlane = this;
            case dual mode:
                if (pParentPlan-> pControlPlane != NULL)
                    return;
                pParentPlan-> pControlPlane = this;
                break;
            default:
        }
        pParentPlan = pParent;    //link technology plane to plan
        technology = this technology        //mark the technology
        pFirstGroup = NULL;    //no group in the plane when constructed
    }
    // destructor
    ~plane(void)
    {
        group *pGroup = pFirstGroup;          //scan all groups in plane
        while (pGroup != NULL)
        {
            group *pNext = pGroup->pNextGroup;  //remember next group
            delete pGroup;       //and destroy current one
            pGroup = pNext;
        }
    }
```

FIG. 14A

```
    // find the radio plan to which the technology plane belongs
    radioPlan *getParent(void)    { return pParentplan; }
    // support looping over all groups in the sector
    group *getFirstGroup(void)              { return pFirstGroup; }
    group *getNextGroup(group *pGroup)   { return pGroup->pNextGroup; }
    // find the channel table for the sector
    channelTable *getChannelTable(void)     { return pChannelTable; }
 friend void group::group(sector *pParentSec, plane *pParentPl)
 friend void group::~group(void)
};
```

```
    typedef constraint_t int;                              //constraint type
class constraint    {
    private:
        plane *pParentPlane;            //point to the parent technology plane
        int index;                           //index for constraint matrix
        status_t status;                    //status of constraint matrix
    public:
        // constructor
        constraint(plane *pParent)
        {
            pParentPlane = pParent      //point to the parent technology plane
            pParentPlane->pConstraint = this;    //make the plane point to this
            fileStatus = UNKNOWN;
        }
        // destructor
        ~constraint(void)
        {
            pParentPlane->pConstraint = NULL;        //remove from the plane
        }
        //find technology plane to which this constraint matrix belongs
        plane *getParentPlane(void) { return pParentPlane; }
        // read/write one element of the matrix
        constraint_t read_constraint(int *row_index, int *col_index);
        void write_constraint(int *row_index, int *col_index,
                        constraint_t constraint_value);
};
```

```
class ctoi {
private:
    plane *pParentPlane;              //point to the parent technology plane
    int index;                        //index for pairwise C/I matrix
    double percentile;                                       //default 10%
    double log_normal_sigma;                                 //default 6 dB
    double max_correlation_coeff;                            //default 0.9
    status_t status;                  //status of pairwise C/I matrix
public:
    // constructor
    ctoi(plane *pParent)
    {
        pParentPlane = pParent        //point to parent technology plane
        pParentPlane->pConstraint = this;      //make plane point to this
        fileStatus = UNKNOWN;
    }
    // destructor
    ~ctoi(void)
    {
        pParentPlane->pConstraint = NULL;         //remove from plane
    }
    //find technology plane to which this pairwise C/I matrix belongs
    plane *getParentPlane(void)     { return pParentPlane; }
    //read/write one element of the matrix
    constraint_t read_constraint(int *row_index, int *col_index);
    void write_constraint(int *row_index, int *col_index,
                constraint_t constraint_value);
};
```

FIG. 16

```
class neighbors  {
    private:
        plane *pParentPlane;           //point to the parent technology plane
        int index;                                      //index for neighbor list
        status_t status;                              //status of neighbor list
    public:
        // constructor
        constraint(plane *pParent)
        {
            pParentPlane = pParent          //point to parent technology plane
            pParentPlane->pNeighbors = this;      //make plane point to this
            fileStatus = UNKNOWN;
        }
        // destructor
        ~constraint(void)
        {
            pParentPlane->pNeighbors = NULL;             //remove from plane
        }
        //find technology plane to which this neighbor list belongs
        plane *getParentPlane(void) { return pParentPlane; }
        // read/write one element of the neighbor list
        constraint_t read_constraint(int *row_index, int *col_index);
        void write_constraint(int *row_index, int *col_index,
                        constraint_t constraint_value);
};
```

```
class channelTable {
    private:
        char *label;
    public:
        // loop over all logical channels in the channel table
        channel *get_next_channel(channel *channel_ptr);
        // loop over all logical channels in the channel table in the given set
        channel *get_next_channel(channel *channel_ptr,
                        channel_set *channel_set_ptr);
        // loop over all sectors that use the channel table
        sector *get_next_sector(sector * sector_ptr);
};
```

```
class channel  {
    private:
        char *label;
    public:
        // find the adjacent channel below, if any (else, NULL)
        channel *channel_below_ptr;
        // find the adjacent channel above, if any (else, NULL)
        channel *channel_above_ptr;
        // find the separation from another channel
        constraint_t get_separation(channel *other_channel_ptr);
        // loop over all TRX groups with this assignment
        group *get_next_group(group *group_ptr);

METHOD AND SYSTEM FOR MODELING A RADIO COMMUNICATIONS NETWORK

TECHNICAL FIELD OF THE INVENTION

The present invention relates to the field of cellular communication systems. More specifically, the present invention relates to modeling radio communications networks for use in cellular network planning tools.

BACKGROUND OF THE INVENTION

As cellular communication has become more popular, cellular service providers have felt increasingly pressured to use the cellular radiofrequency (RF) spectrum as efficiently as possible. Greater efficiency allows a service provider to carry more calls using a given amount of RF spectrum. The problem of efficiently assigning the given amount of RF spectrum, i.e., channels, within a cellular network is a complex one.

Typically, a service provider is allocated a pool of channels for use within a network. The provider controls the assignment of the channels of the pool to various cells in the network. Automated approaches to network planning are being developed to assist service providers in devising channel assignment plans for cellular networks. Some automated network planning tools involve simulating the actual radio communications network to predict the propagation of radiofrequency (RF) signals in order to define the radio coverage areas for base stations, to characterize potential interference within a simulated environment in order to effectively perform frequency planning, to perform hand-off analysis, and so forth.

Typically, a radio communications network includes a plurality of cell sites operated by the service provider. Cell sites are transmit/receive locations through which radio links are established between a switching office and wireless units. The area served by a cell site is referred to as a "cell". The physical components, or constituents, of a typical cell site include antennas, transmit/receive units, and radio controllers. Although cell sites include many similar constituents, their configuration can vary widely from cell site to cell site within a radio communication network depending upon the desired cellular service for a particular cell.

For example, one cell site configuration produces a cell that is sectored into several smaller patterns of coverage, i.e., sectors. Sectoring is applied when the capacity of the cell site is insufficient or when interference becomes a problem. Sectoring divides the number of channels assigned to the cell into smaller groups of channels, which are assigned to a sector through the use of directional antennas.

Another cell site configuration allows a radio signal to be broadcast simultaneously on two different antennas, i.e., simulcast. Simulcast is accomplished by splitting a radiofrequency signal. The resulting split signal is broadcast from two antennas at half the transmission power. Simulcast signal broadcasting allows more flexibility with respect to antenna patterns.

Other cell site configurations include the use of multiple antennas operating at different frequencies, repeaters for amplifying and relaying signals between a serving cell site and wireless units located in a "hole" or "weak spot" in the cell served by the serving cell site, multiple combiners at a cell site, underlay/overlay transmission configurations, and so forth.

In addition to the variety of cell site configurations possible in a radio communications network, other information that affects frequency planning includes the type of service available in the network, communication channels available for assignment, channel assignment constraints, carrier-to-interference ratio constraints, neighbors lists, and so forth. This information coupled with the cell site configurations can be organized in very complex ways to reflect the interrelationships between the various physical components of the wireless system.

In order to accurately model a radio communications network, a network planning tool should desirably be able to readily model the many known and evolving cell site configurations. In addition, the network planning tool should readily associate the cell site configurations with the other related information discussed above for effective frequency planning.

SUMMARY OF THE INVENTION

Accordingly, it is an advantage of the present invention that a method and system for modeling a radio communications network are provided.

Another advantage of the present invention is that the method and system readily create a hierarchical data structure that models the radio communications network.

Another advantage of the present invention is that the method and system allow the hierarchical data structure to be modified in a cost effective manner.

Another advantage of the present invention is that the method and system associate related frequency planning information with the radio communications network for effective frequency planning.

Yet another advantage of the present invention is that the method and system implement an object oriented programming environment which decreases development time and lowers overall development costs.

The above and other advantages of the present invention are carried out in one form by a computer-readable storage medium containing executable code for instructing a computer to create a hierarchical data structure modeling a radio communications network having a plurality of cell sites. The executable code instructs the computer to receive a network configuration for the radio communications network and identify, in response to the network configuration, cell site constituents of one of the cell sites in the radio communications network. The executable code further instructs the computer to create distinct objects to represent each of the cell site constituents and link each of the distinct objects according to a cell site configuration of the one cell site.

The above and other advantages of the present invention are carried out in another form by a computer-based method for creating a hierarchical data structure modeling a radio communications network having a plurality of cell sites. The method calls for receiving a network configuration for the radio communications network, identifying, in response to the network configuration, cell site constituents of one of the cell sites, and creating distinct objects to represent each of the cell site constituents. Communication technology types employed in the radio communications network are defined and technology objects are formed, one each of the technology objects representing one each of the communication technology types. A channel table for the radio communications network is obtained, the channel table encompassing communication channels available for assignment in the radio communications network, and a channel table object is generated to represent the channel table. The distinct objects are linked according to a cell site configuration of the one cell site and the technology objects and the channel table object are associated with the distinct objects.

The above and other advantages of the present invention are carried out in another form by a computing system for configuring a hierarchical data structure modeling a radio communications network. The computing system includes a processor, a computer-readable storage medium, and executable code recorded on the computer-readable storage medium for instructing the processor to create the hierarchical data structure. The executable code includes a cell site constituent identification module for identifying cell site constituents of a cell site in the radio communications network and a distinct object module having cell site classes, each of the cell site classes containing instructions for creating a distinct object representing one of the cell site constituents. The code further includes a communication technology type definition module for defining communication technology types employed in the radio communication network and a technology object module having technology type classes, each of the technology type classes containing instructions for creating technology objects representing the communication technology types. The code also includes a channel table acquisition module for obtaining communication channels available for assignment in the radio communications network and a channel table object module having a channel table class containing instructions for generating a channel table object to represent the available communication channels and a channel class containing instructions for generating logical channel objects for each of a plurality of logical communication channels. An object linking module has instructions for linking the distinct objects in accordance with a cell site configuration of the cell site and an object association module associates the technology objects, the channel table object, and the logical channel objects with the distinct objects.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 8 shows an exemplary pseudocode listing of a radio plan object class of a distinct object module of the system of FIG. 7;

FIG. 9 shows an exemplary pseudocode listing of a base station object class of the distinct object module of the system of FIG. 7;

FIG. 10 shows an exemplary pseudocode listing of a sector controller object class of the distinct object module of the system of FIG. 7;

FIGS. 11a–11b show an exemplary pseudocode listing of a transmit/receive group object class of distinct object module of the system of FIG. 7;

FIGS. 12a–12b show an exemplary pseudocode listing of a transmit/receive element object class of the distinct object module of the system of FIG. 7;

FIG. 13 shows an exemplary pseudocode listing of an antenna class of the distinct object module of the system of FIG. 7;

FIGS. 14a–14b show an exemplary pseudocode listing of technology plane, or type, class of a technology object module of the system of FIG. 7;

FIG. 15 shows an exemplary pseudocode listing of a constraint matrix class of the technology object module of the system of FIG. 7;

FIG. 16 shows an exemplary pseudocode listing of a C/I matrix class of the technology object module of the system of FIG. 7;

FIG. 17 shows an exemplary pseudocode listing of a neighbors list class of the technology object module of the system of FIG. 7;

FIG. 18 shows an exemplary pseudocode listing of a channel table class of a channel table object module of the system of FIG. 7;

FIG. 19 shows an exemplary pseudocode listing of a channel class of the channel table object module of the system of FIG. 7;

DETAILED DESCRIPTION OF THE PREFERRED EMBODIMENTS

Figure 1:
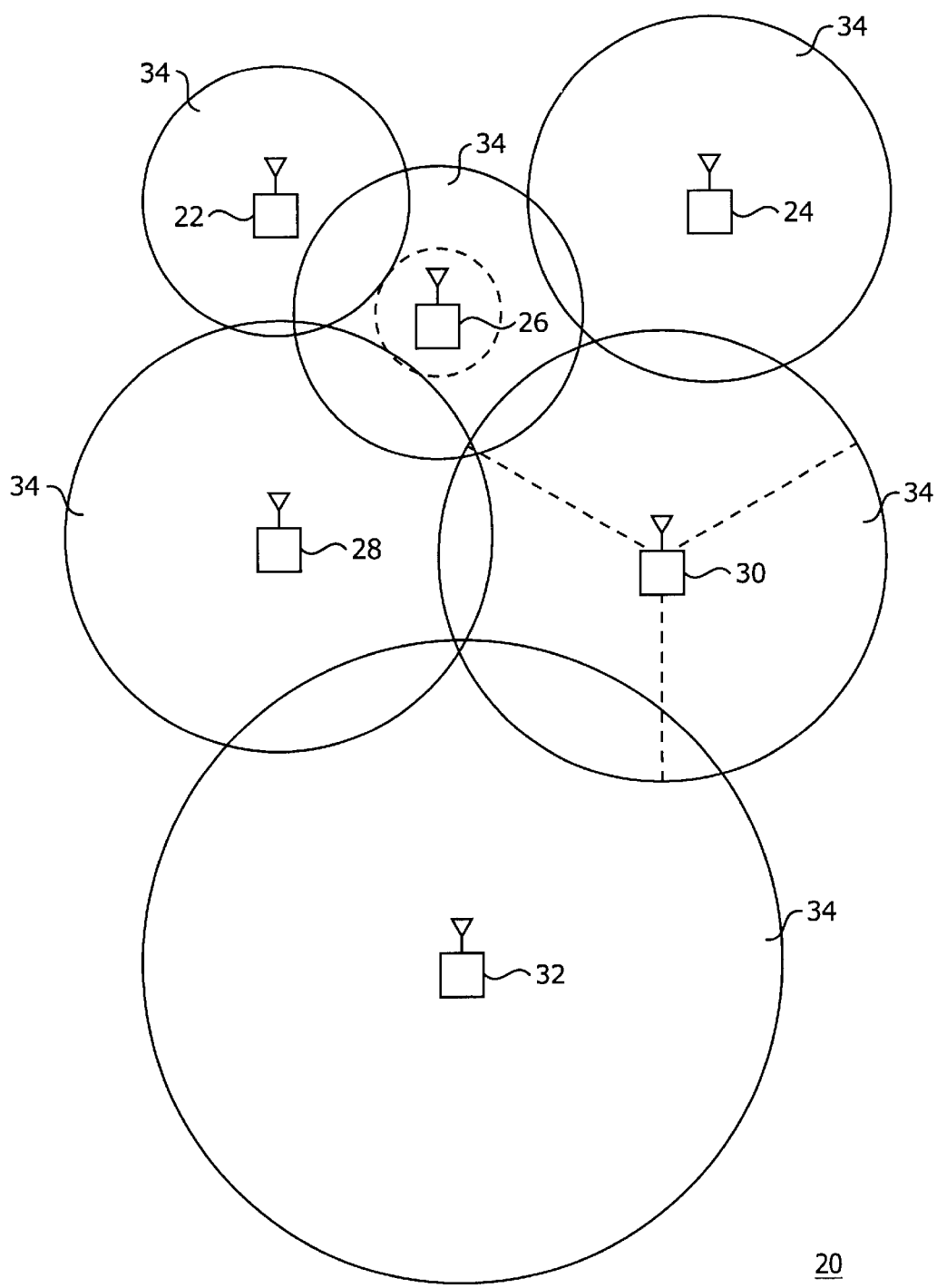
FIG. 1 shows a schematic layout diagram of a radio communications network.

FIG. 1 shows a schematic layout diagram of a radio communications network 20. Network 20 includes a first cell site 22, a second cell site 24, a third cell site 26, a fourth cell site 28, a fifth cell site 30, and a sixth cell site 32. Each of first, second, third, fourth, fifth, and sixth cell sites 22, 24, 26, 28, 30, and 32 controls at least one cell 34 or a sector of cell 34. In other words, cells 34 represent the geographic radio coverage areas of cell sites 22, 24, 26, 28, 30, and 32. Cell sites 22, 24, 26, 28, 30, and 32 may couple to mobile telephone switching offices (not shown) in a manner well known in the art.

Network 20 is shown with only six of cells 34 to provide exemplary cell site configurations (discussed below). Those skilled in the art will recognize that a conventional radio communications network can include many more cells 34. In addition, cells 34 are shown as being generally circular in shape. This circular representation is convenient for schematically denoting a cell's radio coverage area. Those skilled in the art will appreciate that the actual shape and size of cells 34 will vary from cell to cell.

Network 20 is provided to demonstrate some of the many cell site configurations (discussed below) for which the present invention can advantageously be utilized for creating a hierarchical data structure (discussed below) modeling radio communications network 20 for use in frequency planning. Cells and sectors of cells are commonly referred to as cells 34 herein.

Figure 2:
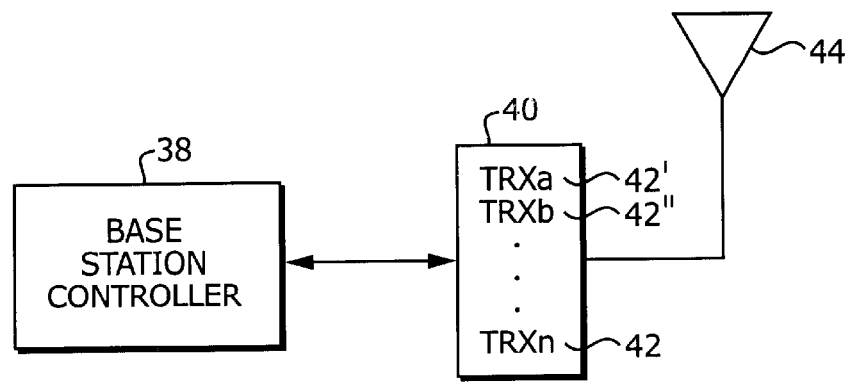
FIG. 2 shows a block diagram of a first cell site configuration of a first cell site in the radio communications network of FIG. 1.

FIG. 2 shows a block diagram of a first cell site configuration 36 of first cell site 22 (FIG. 1) in radio communications network 20. First cell site configuration 38 shows the interrelationship between the various physical components, that is, the cell site constituents, that form first cell site 22.

First cell site configuration 36 includes a base station controller 38 in communication with a set 40 of transmit/receive elements 42, represented by the alphabetic characters TRXa, TRXb, and TRXn. Set 40 is coupled to a cell site antenna 44.

Base station controller 38 is a control unit that commands set 40 of transmit/receive elements 42, and performs processes, such as automatic link establishment, channel scanning and selection, link quality analysis, polling, sounding, message store, forward address protection, and so forth.

Set 40 includes the circuitry controlled by base station controller 38 responsible for transmitting and receiving radiofrequency signals over assigned communication channels. For example, a first transmit/receive element 42' of set 40, denoted by alphabetic characters TRXa, includes the circuitry for transmitting or receiving over a particular communication channel (not shown). Likewise, a second transmit/receive element 42", denoted by alphabetic characters TRXb, includes the circuitry for transmitting or receiving over a different communication channel (not shown). Ellipsis ( . . . ) indicate that set 40 can include a number of transmit/receive elements 42 not shown in FIG. 2 for clarity of illustration.

Cell antenna 44 is an omnidirectional antenna whose pattern is nondirectional in azimuth for broadcasting and receiving radiofrequency signals in all directions. First cell site configuration 36 also includes other cell site circuitry, such as multiplexers, demultiplexers, modulators, converters, amplifiers, and so forth, that are not shown herein for clarity of illustration.

First cell site configuration 36 represents a conventional cell-site configuration. FIGS. 3–6 demonstrate other cell site configurations that may be present in radio communications network 20 (FIG. 1).

Figure 3:
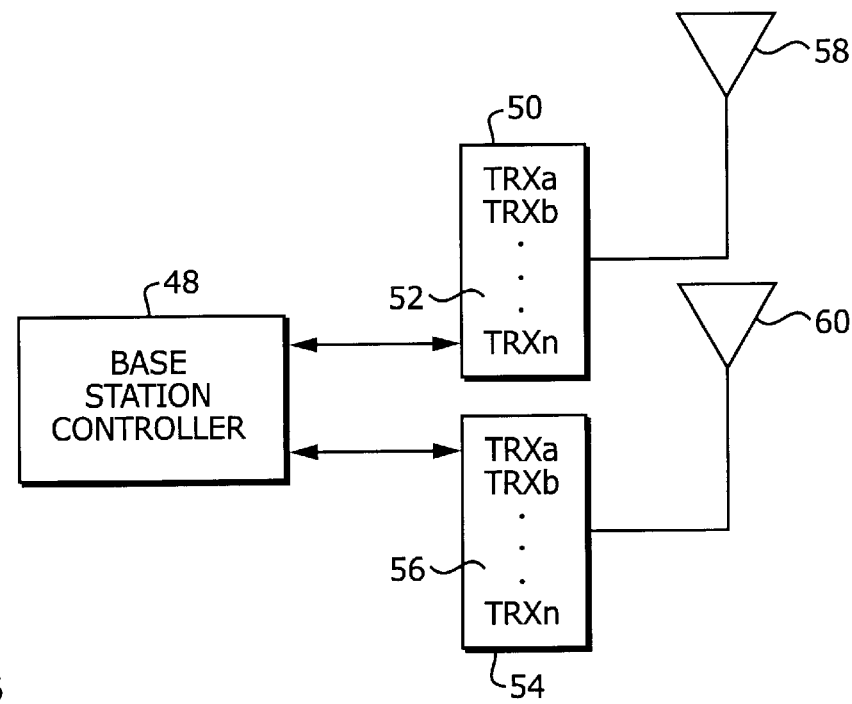
FIG. 3 shows a block diagram of a second cell site configuration of a second cell site in the radio communications network of FIG. 1.

FIG. 3 shows a block diagram of a second cell site configuration 46 of second cell site 24 (FIG. 1) in radio communications network 20 (FIG. 1). Second cell site configuration 46 includes a base station controller 48 in communication with a first set 50 of transmit/receive elements 52. Likewise, base station controller 48 is in communication with a second set 54 of transmit/receive elements 56. First set 50 of transmit/receive elements 52 is coupled to a first cell antenna 58 and second set 56 of transmit/receive elements 52 is coupled to a second cell antenna 60.

Second cell site configuration 46 represents a multiple antenna scenario. In such a scenario, first and second antennas 58 and 60 respectively are transmitting or receiving over a different set of frequencies. For example, assigned communication channels (not shown) for first set 50 of transmit/receive elements 52 may be reserved for Advanced Mobile Phone Service (AMPS) control traffic. Thus, first antenna 58 may be tuned to transmit and receive over the set of frequencies reserved for control channels in an AMPS system. In addition, assigned communication channels (not shown) for second set 54 of transmit/receive elements 56 may be reserved for AMPS voice traffic. Thus, second antenna 60 may be tuned to transmit and receive over the set of frequencies reserved for voice channels in the AMPS system.

Figure 4:
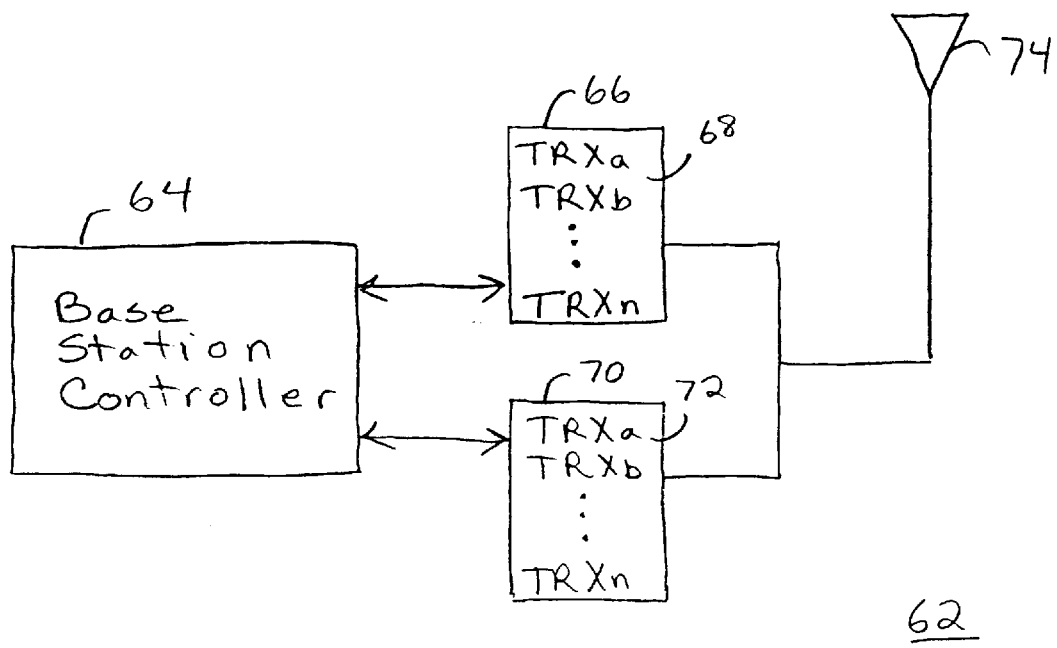
FIG. 4 shows a block diagram of a third cell site configuration of a third cell site in the radio communications network of FIG. 1.

FIG. 4 shows a block diagram of a third cell site configuration 62 of third cell site 26 (FIG. 1) in the radio communications network 20 (FIG. 1). Third cell site configuration 62 includes a base station controller 64 in communication with a first set 66 of transmit/receive elements 68. Likewise, base station controller 64 is in communication with a second set 70 of transmit/receive elements 72. Each of first and second sets 66 and 70, respectively, are coupled to a cell antenna 74.

Third cell site configuration 62 represents a multiple combiner scenario. In other words, radiofrequency signals transmitted through first set 66 of transmit/receive elements 68 are combined with radiofrequency signals transmitted through second set 70 of transmit/receive elements 72 at substantially equivalent or different power levels. The combined radiofrequency signals are subsequently broadcast from cell antenna 74. When the transmit power levels are configured to be substantially equivalent, several communication channels can be cost effectively combined for broadcast through a single antenna.

When the transmit power levels are different, third cell site configuration 62 represents an underlay/overlay scheme. The transmitted power levels of the radiofrequency signals from each of first and second sets 66 and 70 are adjusted for two overlapping radio coverage areas centered at third cell site 26 (FIG. 1). For example, first set 66 serves the smaller radio coverage area, i.e., the underlay, illustrated in FIG. 1 within a dotted line circle. Consequently, the transmit power of the radiofrequency signals transmitted through transmit/receive elements 68 of first set 66 is lower than the transmit power of the radiofrequency signals of second set 70 serving the larger radio coverage area, i.e., the overlay. Different communication channels are assigned to each of first and second sets 66 and 70 so that traffic capacity can be increased for third cell site 26.

Figure 5:
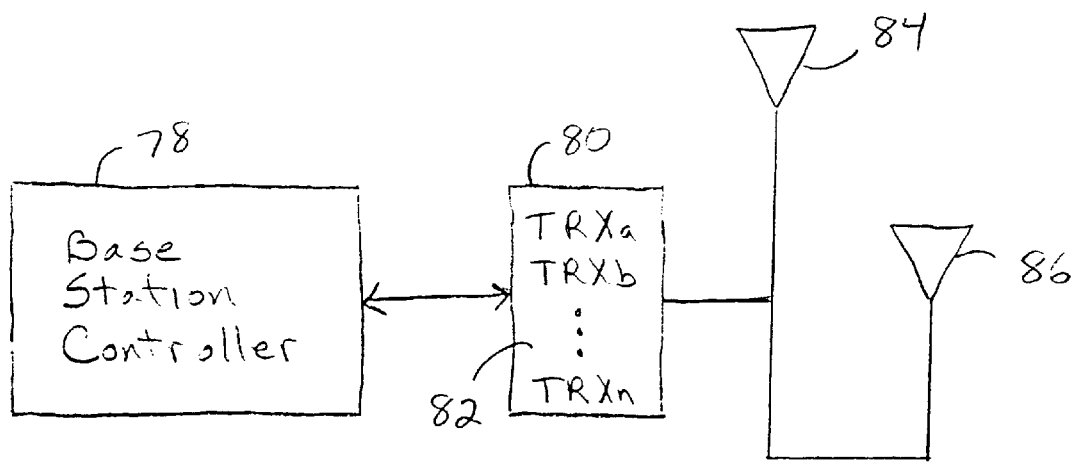
FIG. 5 shows a block diagram of a fourth cell site configuration of a fourth cell site in the radio communications network of FIG. 1.

FIG. 5 shows a block diagram of a fourth cell site configuration 76 of fourth cell site 28 (FIG. 1) in radio communications network (FIG. 1). Fourth cell site configuration 76 includes a base station controller 78 in communication with a set 80 of transmit/receive elements 82. Set 80 is coupled to a first cell antenna 84 and a second cell antenna 86.

Fourth cell site configuration 76 represents a simulcast scenario. In other words, the radiofrequency signals transmitted through transmit/receive elements 82 are split. Each of first and second cell antennas 84 and 86 subsequently broadcasts the radiofrequency signals at approximately half of the original power levels of the radiofrequency signals. Simulcast allows more flexibility with respect to antenna patterns when configuring a cell site.

Figure 6:
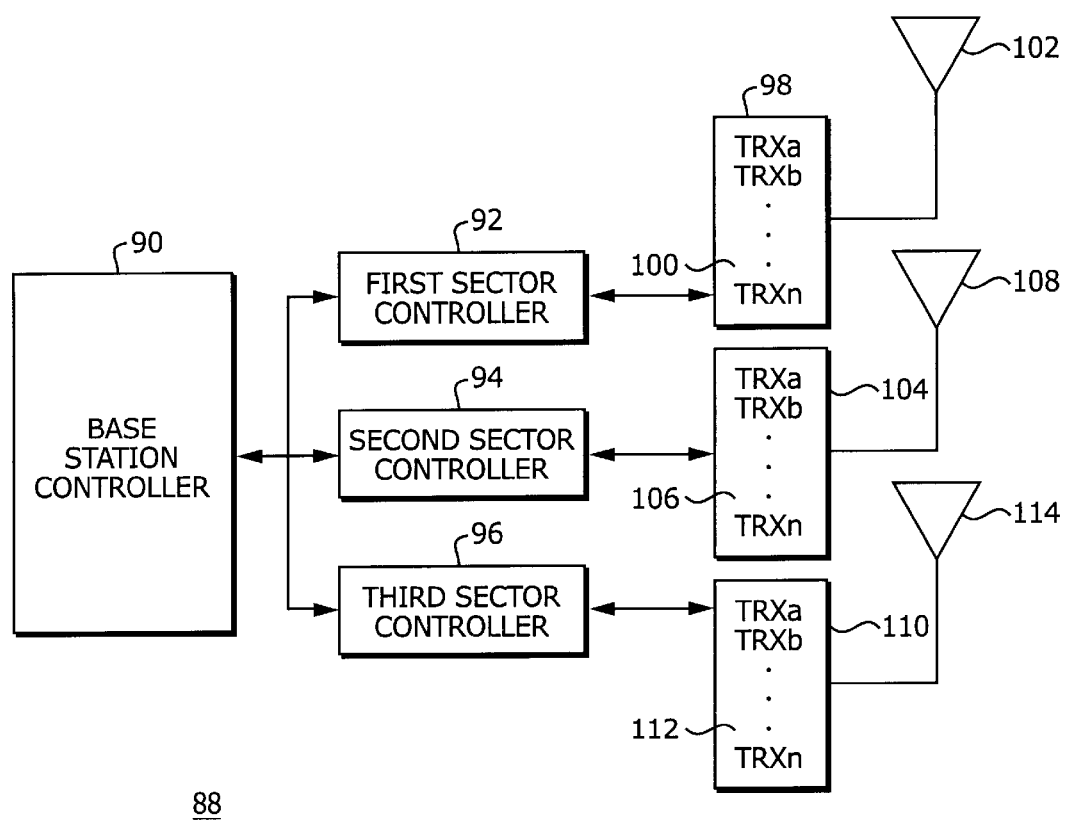
FIG. 6 shows a block diagram of a fifth cell site configuration of a fifth cell site in the radio communications network of FIG. 1.

FIG. 6 shows a block diagram of a fifth cell site configuration 88 of fifth cell site 30 (FIG. 1) in radio communications network 20 (FIG. 1). Fifth cell site configuration 88 includes a base station controller 90 in communication with a first sector controller 92, a second sector controller 94, and a third sector controller 96.

First sector controller 92 controls a first set 98 of transmit/receive elements 100 whose radiofrequency signals are broadcast through a first cell antenna 102. Likewise, second sector controller 94 controls a second set 104 of transmit/receive elements 106 whose radiofrequency signals are broadcast through a second cell antenna 108. In addition, third sector controller 96 controls a third set 110 of transmit/receive elements 112 whose radiofrequency signals are broadcast through a third cell antenna 114.

Fifth cell site configuration 88 represents a sectored cell scenario. In other words, fifth cell 30 (FIG. 1) is divided into three sectors, illustrated in FIG. 1 by dotted line lines separating each sector. The communication channels assigned to fifth cell 30 are subdivided into three groups, each group being managed by one of first, second, and third sector controllers 92, 94, and 96, respectively. Radiofrequency signals transmitted through first, second, and third sets 98, 104, and 110, respectively, are subsequently broadcast through their respective directional antenna, first, second, and third cell antennas 102, 108, and 114. Sectoring is applied when the capacity of the cell site is insufficient or when interference becomes a problem.

First, second, third, fourth, and fifth cell site configurations 36, 46, 62, 76, and 88 are but a few of the many arrangements of cell site constituents that may be employed in a radio communication network. The present invention models each of these configurations and other continuously evolving cell site configurations and associates the cell site configurations with auxiliary information relevant to frequency planning in a cost effective, readily adaptable manner.

Figure 7:
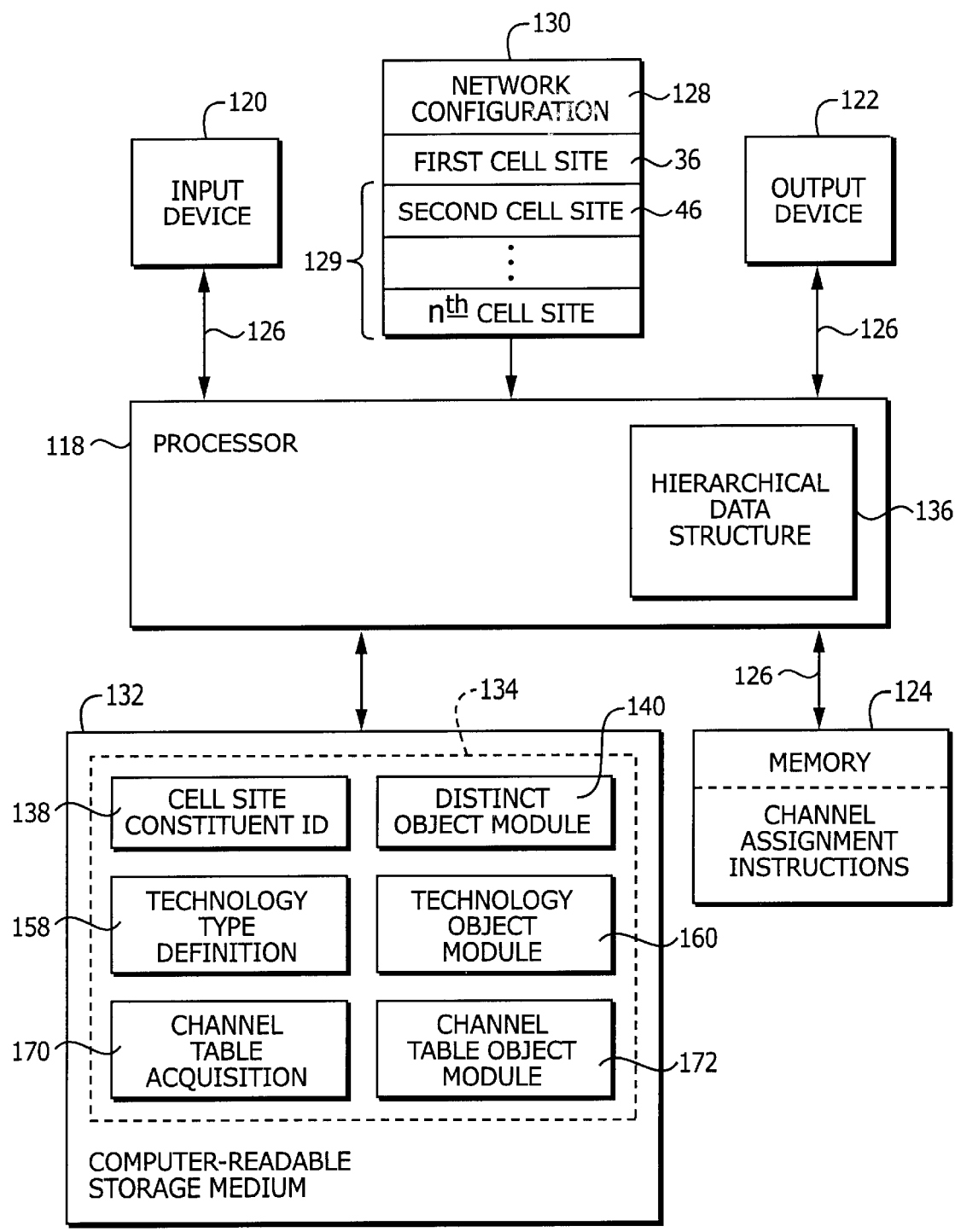
FIG. 7 shows a simplified block diagram of a system for modeling the radio communications network.

FIG. 7 shows a simplified block diagram of a computing system 116 for modeling radio communications network 20 (FIG. 1). System 116 includes a processor 118 on which the methods according to the invention can be practiced. Processor 118 is in communication with an input device 120, an output device 122 and a memory system 124 having recorded therein channel assignment instructions. These elements are interconnected by a bus structure 126.

Processor 118 includes a data reader (not shown) for reading data, such as a radio communications network configuration database 128 from a storage device 130. Database 128 includes a number of cell site configurations 129, such as first and second configurations 36 and 46, respectively, and will be described in further detail below. The data reader may include a hard disk drive internal or external to processor 118, a tape drive, floppy disk drive, CD-ROM, or a combination thereof. Storage device 130 may be a hard disk, floppy disk, a compact disk, a personal computer memory card international association (PCMCIA) card, and the like.

Input device 120 can encompass a keyboard, mouse, pointing device, audio device (e.g., a microphone), or any other device providing input to processor 118. Output device 122 can encompass a display, a printer, an audio device (e.g., a speaker), or other devices providing output from processor 118. Input and output devices 120 and 122 can also include network connections, modems, or other devices used for communications with other computer systems or devices.

Computing system 116 also includes a computer-readable storage medium 132. Computer-readable storage medium 132 may be a magnetic disk, compact disk, or any other volatile or non-volatile mass storage system readable by processor 118. Computer-readable storage medium 132 may also include cooperating or interconnected computer readable media, which exist exclusively on computing system 116 or are distributed among multiple interconnected computer systems (not shown) that may be local or remote.

Executable code 134 is recorded on computer-readable storage medium 132 for instructing processor 118 to create a hierarchical data structure 136 modeling radio communications network 20 (FIG. 1). In a preferred embodiment, executable code 134 is implemented utilizing object oriented programming. Object oriented programming, as is well known in the art, is used to design computer software that is easy to create, cost effective to modify, and reusable. Object oriented software provides data abstraction, which hides the physical representation of data within objects, and thus lessens the impact of changes when modifications are made to the software.

As is well known in the art, an "object" is a data structure whose physical format is hidden behind a type definition. Data structures, also referred to as records or formats, are organization schemes applied to data so that it can be interpreted, and so that specific operations can be performed on that data. Such data structures are employed to impose a physical organization on network configuration database 128 by representing cell site constituents of radio communication network 20 (FIG. 1) as well as auxiliary information (discussed below) used during frequency planning.

An "object type," also called a "class," includes a data type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through an object pointer. An application obtains this object reference by using some type of function call (direct or implied) in which that function allocates an object block in computer memory, initializes the function table, and returns the reference to the computer memory to an application. The computer memory may be local or distributed on a remote computer.

Executable code 134 is executed by processor 118 to create hierarchical data structure 136 modeling radio communication network 20 (FIG. 1) in response to the receipt of network configuration 130. The channel assignment instructions of memory system 124 are executable by processor 118 for assigning communication channels in response to hierarchical data structure 136. Radio communications in network 20 (FIG. 1) are subsequently conducted at cell sites 22, 24, 26, 28, 30, and 32 (FIG. 1) in accordance with the assigned communication channel. Memory system 124 is illustrated as being separate from computer-readable storage medium 132, for clarity of illustration. However, it should be readily understood that the channel assignment instructions of memory system 124 may be incorporated into executable code 134.

Executable code 134 includes a cell site constituent identification module 138. Cell site constituent identification module 138 includes program code for identifying the various physical components, that is, the cell site constituents, that form a cell site. Referring momentarily to fifth cell site configuration 88 (FIG. 6), the cell site constituents include base station controller 90, first, second, and third sector controllers 92, 94, and 96, first set 98 of transmit/receive elements 100, second set 104 of transmit/receive elements 106, third set 110 of transmit/receive elements 112, and first, second, and third antennas 102, 108, and 114, respectively.

With reference back to system 116 (FIG. 7), a distinct object module 140 of executable code 134 operates in cooperation with cell site constituent identification module 138. Distinct object module 140 includes cell site classes, each of the cell site classes containing instructions for creating a distinct object representing one of the cell site constituents. FIGS. 8–13 show exemplary pseudocode listings of classes of distinct object module 140. The purpose of the classes will become readily apparent in the ensuing discussion.

FIG. 8 shows an exemplary pseudocode listing of a radio plan class 142 of distinct object module 140. A radio plan object (discussed below) is created to identify radio communication network 20 (FIG. 1) and forms the parent for hierarchical data structure 136. Radio plan object class 142 includes a constructor 144 and a destructor 146. In accordance with object oriented programming, a constructor is a function that creates a new object belonging to a specified class. A destructor function is used to delete the object when it is no longer needed. In the C++ object oriented programming language, for example, constructors and destructors are defined in the class definition.

FIG. 9 shows an exemplary pseudocode listing of a base station class 148 of distinct object module 140. A site object (discussed below) is created to represent a base station controller at a cell site and has links to the radio plan object.

FIG. 10 shows an exemplary pseudocode listing of a sector controller class 150 of distinct object module 140. A sector object (discussed below) is created to represent sector controllers at a cell site and has links to the site object.

FIGS. 11a–11b show an exemplary pseudocode listing of a transmit/receive group class 152 of distinct object module 140. A group object (discussed below) is created to form a logical construct of a collection of transmit/receive elements each of which utilize a common technology type (discussed below) and has links to a sector object.

FIGS. 12a and 12b show an exemplary pseudocode listing of a transmit/receive element class 154 of distinct object module 140. An element object (discussed below) is created for each transmit/receive element at a cell site and has links to a group object.

FIG. 13 shows an exemplary pseudocode listing of an antenna class 156 of distinct object module 140. Antenna class 156 is intended to describe a particular antenna that is mounted at a cell site. Antenna class 156 includes the mounting information, including height and orientation, as well as the antenna model type. An antenna object (discussed below) is created for each antenna used at a cell site and has links to the group object.

Referring back to computing system 116 (FIG. 7), executable code 134 further includes a technology type, or plane, definition module 158. Technology type definition module 158 includes program code for defining the communication technology types employed in radio communications network 20 (FIG. 1). Communication technology types may be advanced mobile phone service (AMPS) control, AMPS traffic, code division multiple access (CDMA), time division multiple access (TDMA), dual mode, and so forth. An example of a dual mode technology type is adjacent site pairing. In adjacent site pairing, the same communication channel or channels is/are shared between adjacent cells or adjacent sectors. Thus, if one of the cells or sectors require additional capacity, that cell or sector borrows the shared channel from its adjacent cell or sector.

A technology object module 160 of executable code 134 operates in cooperation with technology type definition module 158. Technology object module 160 includes a technology type class containing instructions for creating technology objects representing the communication technology types employed in radio communications network 20 (FIG. 1).

In addition, each communication technology type has associated therewith auxiliary information relevant to frequency planning. Such auxiliary information includes a constraint matrix, a carrier-to-interference (C/I) ratio matrix, and/or a neighbors list. The constraint matrix is utilized in the process of computing a radio plan. The constraint matrix provides rules for channel assignment in frequency planning. Such rules may include how closely in frequency or in space a pair of channel assignments can be made. The C/I ratio matrix provides, for any given pair of transmit/receive elements, information regarding the amount of interference one transmit/receive element might have when both transmit/receive elements are transmitting at the same frequency. The neighbors list provides a list of channels that are shared between neighboring cells or sectors.

Accordingly, technology object module 160 includes a constraint matrix class for creating a constraint object (discussed below). Likewise, technology object module 160 includes a C/I matrix class for creating a C/I matrix object, and a neighbors list class for creating a neighbors list.

FIGS. 14a–14b show an exemplary pseudocode listing of technology plane, or type, class 162 of technology object module 160. FIG. 15 shows an exemplary pseudocode listing of a constraint matrix class 164 of technology object module 160. FIG. 16 shows an exemplary pseudocode listing of a C/I matrix class 166 of technology object module 160, and FIG. 17 shows an exemplary pseudocode listing of a neighbor list class 168 of technology object module 160. The interrelationship of the cell site constituents described in connection with FIGS. 8–13 and objects created from technology class 162, constraint matrix class 164, C/I matrix class 166, and neighbor list class 168 will become apparent in the ensuing discussion.

Referring back to computing system 116 (FIG. 7), executable code 134 further includes a channel table acquisition module 170. Channel table acquisition module 170 includes program code for obtaining communication channels available for assignment in radio communications network 20 (FIG. 1).

A channel table object module 172 of executable code 134 operates in cooperation with channel table acquisition module 170. Channel table object module 172 includes a channel table class containing instructions for generating a channel table object to represent the available communication channels. FIG. 18 shows an exemplary pseudocode listing of a channel table class 174 of channel table object module 172.

With reference back to system 116 (FIG. 7), channel table object module 172 also includes a channel class containing instructions for generating logical channel objects for each of a plurality of logical communication channels. FIG. 19 shows an exemplary pseudocode listing of a channel class 176 of channel table object module 172. The interrelationship of the cell site constituents described in connection with FIGS. 8–13 and objects created from channel table class 174 and channel class 176 will become apparent in the ensuing discussion.

Figure 20:
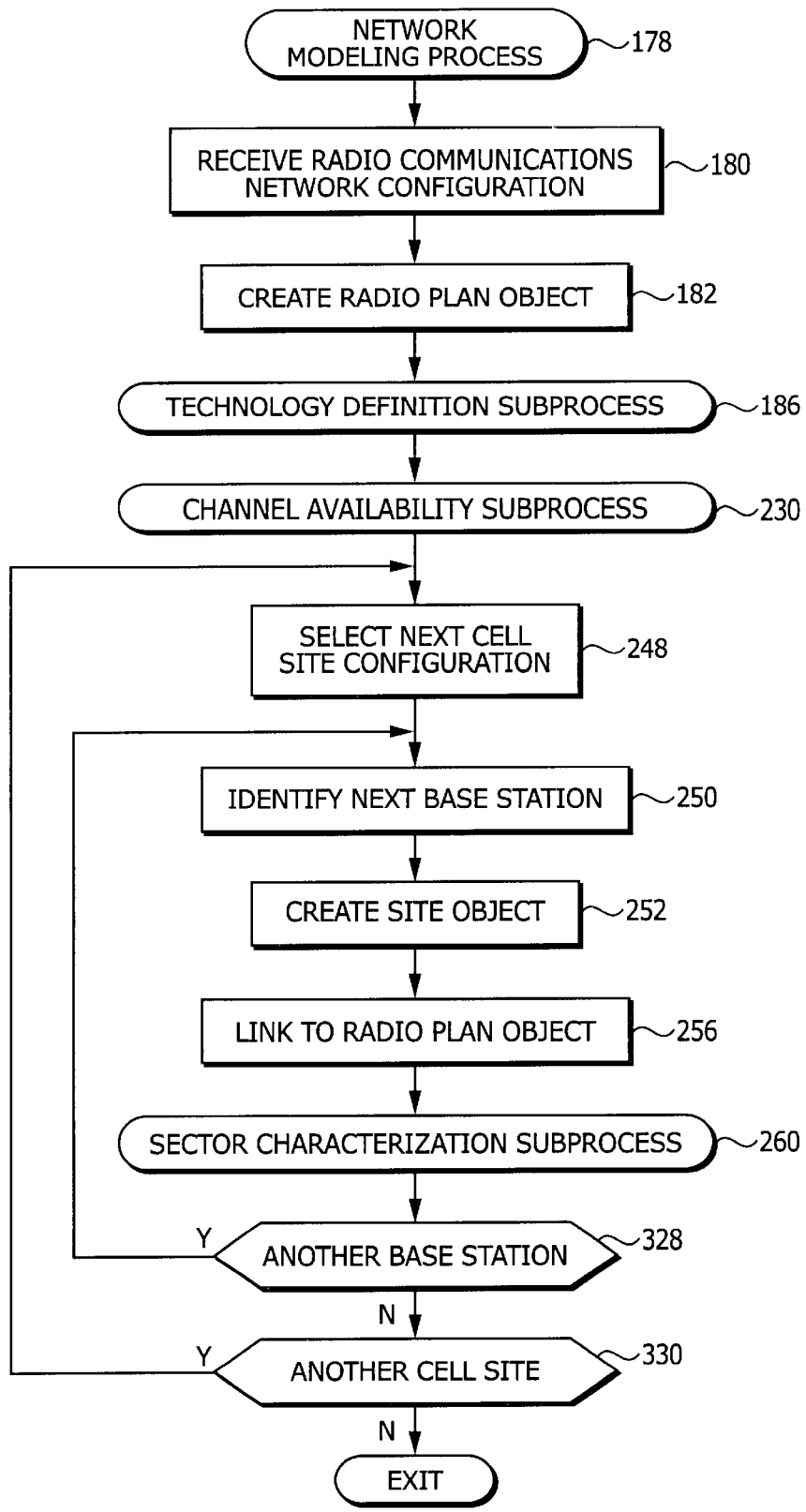
FIG. 20 shows a flow chart of an exemplary network modeling process.
Figure 21A:
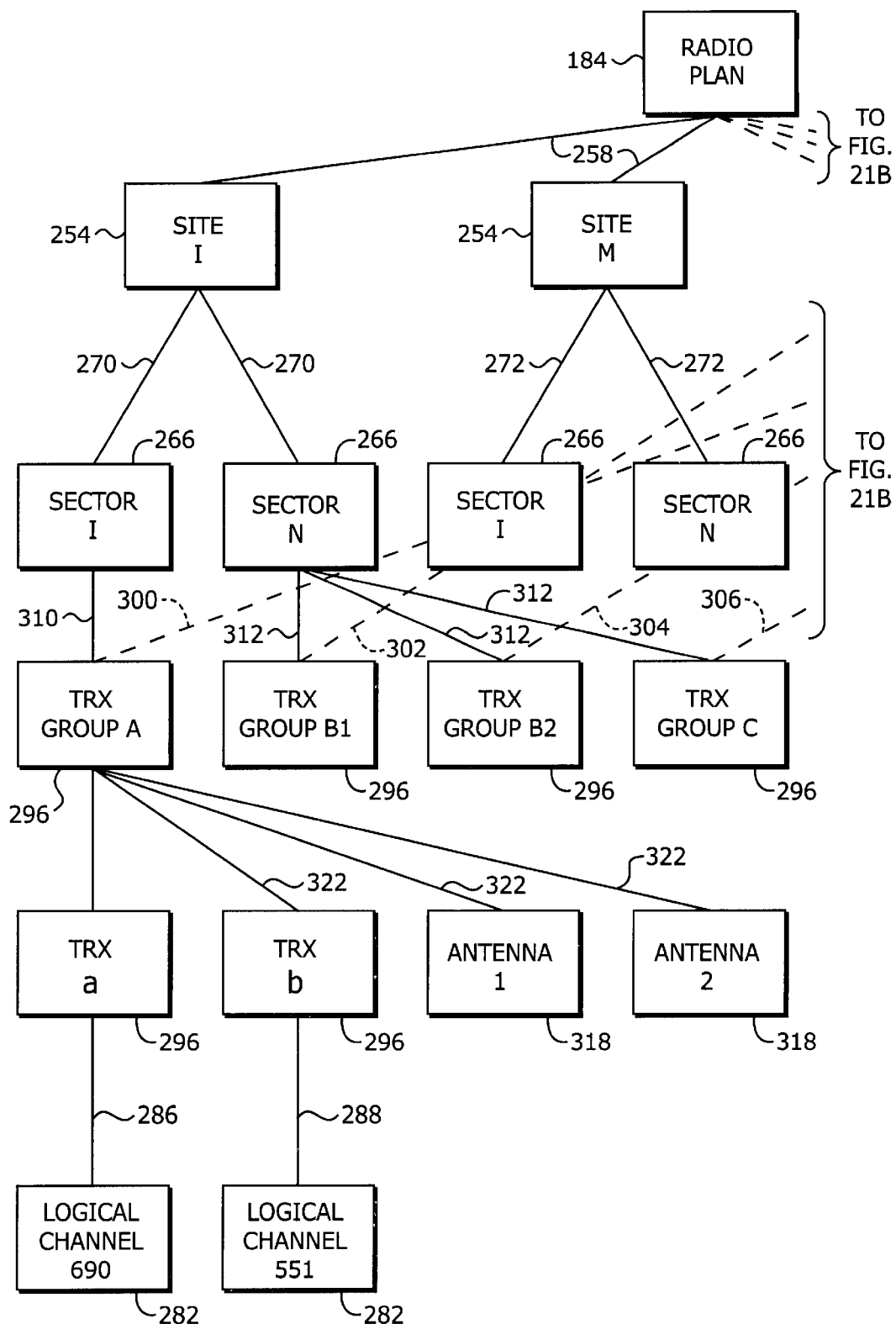
FIG. 21 shows a hierarchical data structure created through the execution of the network modeling process.
Figure 21B:
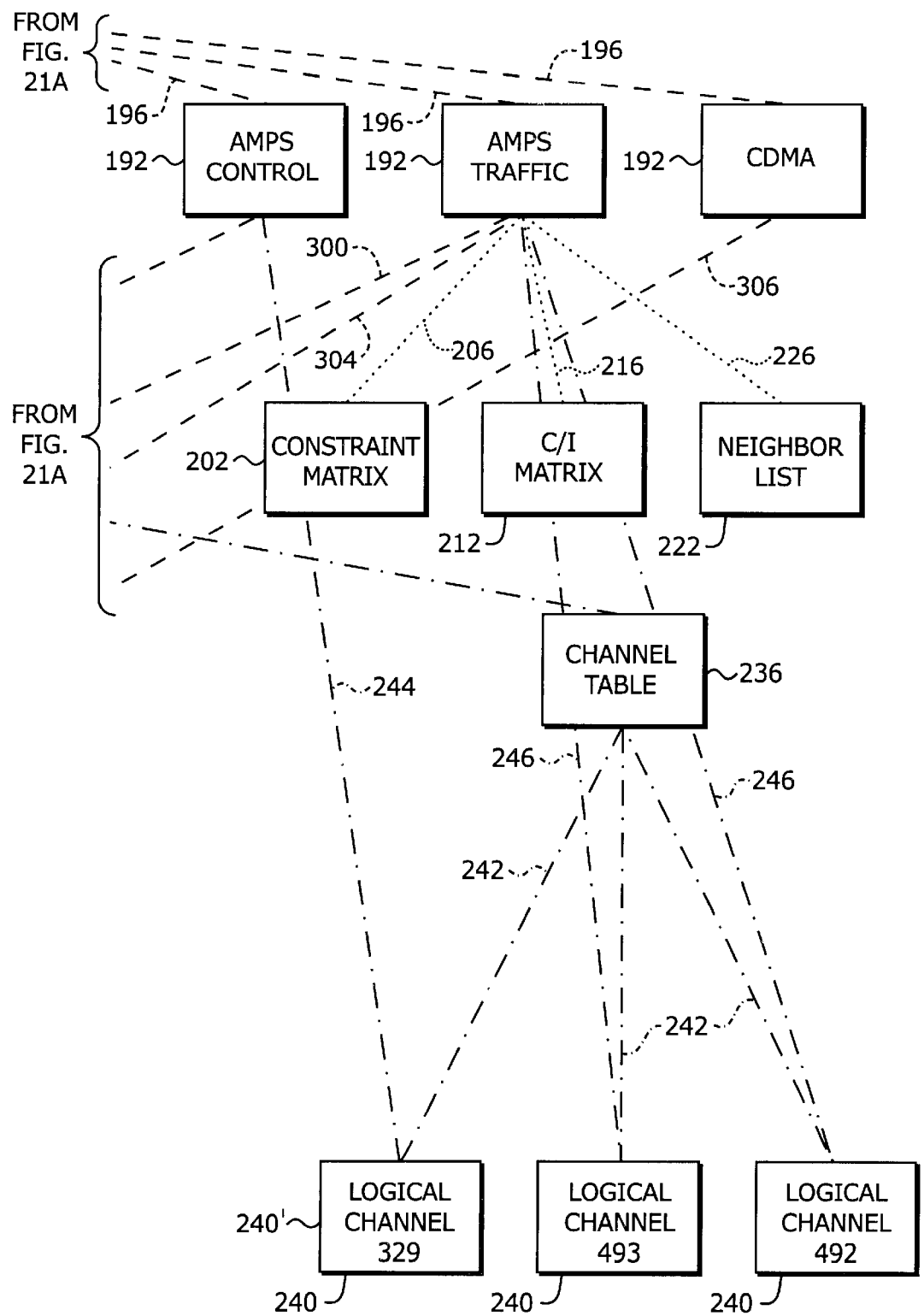

Referring to FIGS. 20 and 21, FIG. 20 shows an exemplary flow chart of a network modeling process 178. FIG. 21 shows hierarchical data structure 136 created through the execution of network modeling process 178. Hierarchical data structure 136 is a model of radio communications network 20 (FIG. 1) that may be readily employed for frequency planning, for carrying out interference calculations, and so forth. Process 178 begins with a task 180.

Task 180 causes processor 118 (FIG. 7) to receive radio communications network configuration database 128 (FIG. 7). Database 128 may include "brownfield" components. The brownfield nomenclature refers to the sum of all equipment, architectures, procedures, and so forth in a pre-existing radio communications network. Alternatively, database 128 can include "greenfield" components. The greenfield nomenclature refers to a network that is being designed and built from scratch, with no need to accommodate legacy (i.e., pre-existing) equipment or architectures. Database 128 can also include both greenfield and brownfield components when an existing network is being expanded. Database 128 includes, among other things, any number of cell site configurations 129, for example, first and second cell site configurations 36 (FIG. 2) and 46 (FIG. 3).

Following receipt of database 128 in task 180, a task 182 is performed. At task 182, processor 118 (FIG. 7) creates a radio plan object 184 using radio plan object class 142 (FIG. 8) of distinct object module 140 (FIG. 7). Radio plan object 184 is the "parent" object to hierarchical data structure 136. Radio plan object 184, among other things, identifies a particular network, for example radio communications network 20 (FIG. 1).

Figure 22:
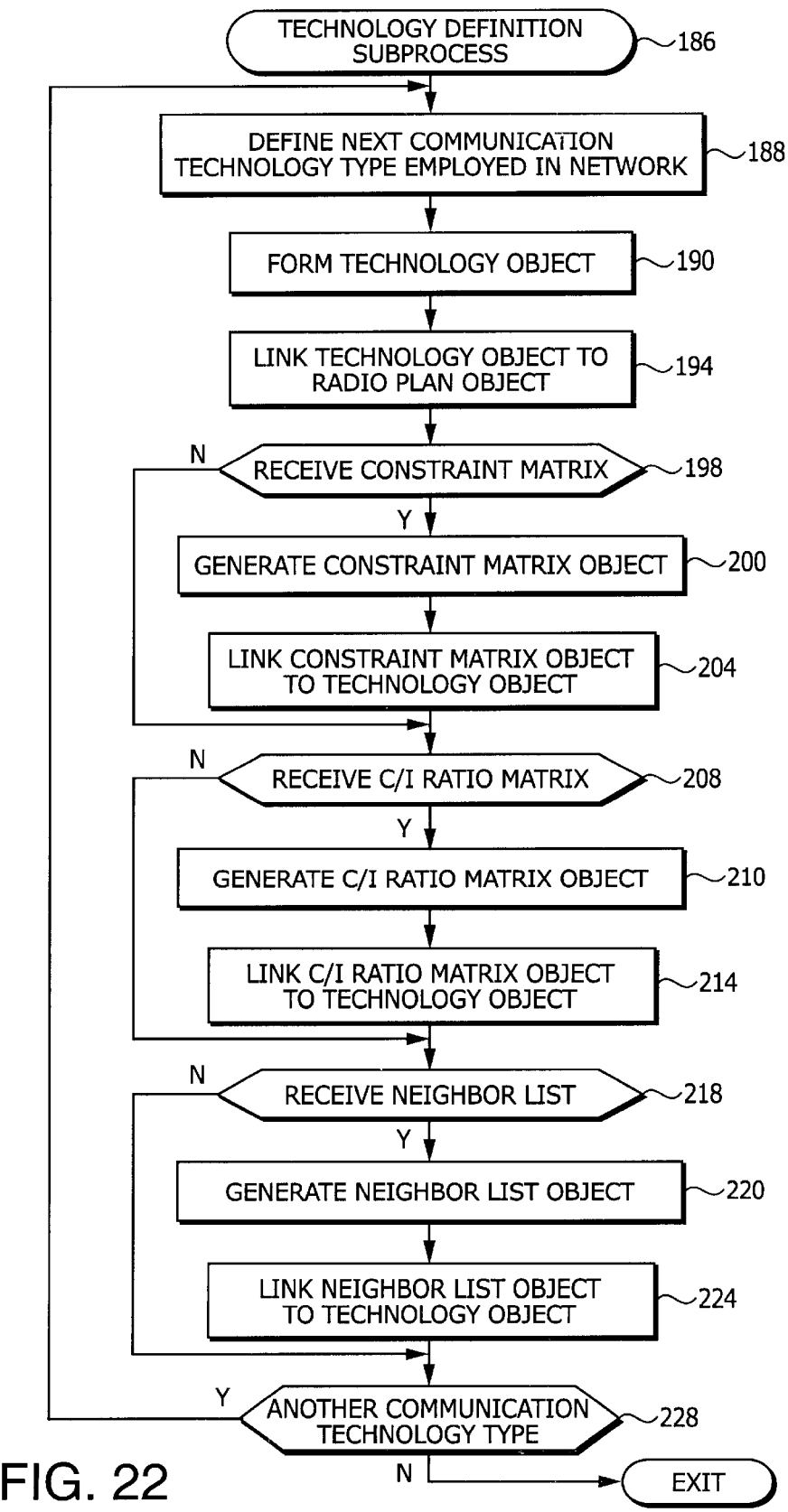
FIG. 22 shows a flow chart of an exemplary technology definition subprocess.

Following task 182, a technology definition subprocess 186 is performed. Referring to FIG. 22, in connection with hierarchical data structure 136 (FIG. 21), FIG. 22 shows a flow chart of an exemplary technology definition subprocess 186. Subprocess 186 is performed through the execution of technology type definition module 158 (FIG. 7) and technology object module 160 (FIG. 7) of executable code 134 (FIG. 7). Subprocess 186 characterizes the communication technology types employed in radio communications network 20.

Subprocess 186 begins with a task 188. Task 188 causes processor 118 (FIG. 7) to define the next communication technology type employed in radio communications network 20 (FIG. 1). Of course, during a first iteration of subprocess 186, the "next" communication technology type will the first technology type of network 20 to be characterized.

A task 190 is performed in connection with definition task 188. At task 190, processor 118 (FIG. 7) creates a technology object 192 (FIG. 21) using technology plane class 162 (FIGS. 14a–14b) of technology object module 160 (FIG. 7). Technology object 192 represents a particular technology type employed in radio communications network 20 (FIG. 1). For example, hierarchical data structure 136 shows three exemplary technology objects 192, AMPS CONTROL, AMPS TRAFFIC, and CDMA. In other words radio communications network 20 may be a dual technology network providing both AMPS analog and CDMA digital service.

Following task 190, a task 194 is performed to link technology object 192 to radio plan object 184. Technology plane class 162 (FIG. 14a) provides pointers 196 diagrammatically represented in hierarchical data structure 136 for linking technology object 192 to radio plan object 184.

Following task 194, a query task 198 is performed. At query task 198, processor 118 determines if a constraint matrix is received for the defined technology class, represented by technology object 192. When a constraint matrix is received, subprocess 186 proceeds to a task 200.

At task 200, processor 118 (FIG. 7) creates a constraint matrix object 202 using constraint matrix class 164 (FIG. 15) of technology object module 160 (FIG. 7). Constraint matrix object 202 represents channel assignment constraints for a particular technology type employed in radio communications network 20 (FIG. 1).

In response to task 200, a task 204 is performed to link constraint matrix object 202 to the particular technology object 192 with which it is associated. Pointers are provided by each of technology plane class 162 (FIGS. 14a–14b) and constraint matrix class 164 (FIG. 15) to link constraint matrix object 202 to technology object 192. For example, a pointer 206 linking constraint matrix object 202 to AMPS TRAFFIC technology object 192 is diagrammatically represented in hierarchical data structure 136.

Only one constraint matrix object 202 is shown for clarity of illustration in FIG. 21. However, it should be understood that each of AMPS CONTROL, CDMA, or other technology objects 192 may have associated therewith, a constraint matrix object 202 for the particular technology type.

Following task 204, a query task 208 is performed. Alternatively, when no constraint matrix is received at query task 198, query task 208 is performed. At query task 208, processor 118 (FIG. 7) determines if a carrier-to-interference (C/I) ratio matrix is received for the defined technology class, represented by technology object 192. When a C/I matrix is received, subprocess 186 proceeds to a task 210.

At task 210, processor 118 (FIG. 7) creates a C/I matrix object 212 using C/I matrix class 166 (FIG. 16) of technology object module 160 (FIG. 7). C/I matrix object 212 represents carrier-to-interference constraints for a particular technology type employed in radio communications network 20 (FIG. 1).

In response to task 210, a task 214 is performed to link C/I matrix object 212 to the particular technology object 192 with which it is associated. Pointers are provided by each of technology plane class 162 (FIGS. 14a–14b) and C/I matrix class 166 (FIG. 16) to link C/I matrix object 212 to technology object 192. For example, a pointer 216 linking C/I matrix object 212 to AMPS TRAFFIC technology object 192 is diagrammatically represented in hierarchical data structure 136.

Only one C/I matrix object 212 is shown for clarity of illustration in FIG. 21. However, it should be understood that each of AMPS CONTROL, CDMA, or other technology objects 192 may have associated therewith, a C/I matrix object 212 for the particular technology type.

Following task 214, a query task 218 is performed. Alternatively, when no C/I matrix is received at query task 208, query task 218 is performed. At query task 218, processor 118 (FIG. 7) determines if a neighbors list is received for the defined technology class, represented by technology object 192. When a neighbors list is received, subprocess 186 proceeds to a task 220.

At task 220, processor 118 (FIG. 7) creates a neighbor list object 222 using neighbor list class 168 (FIG. 17) of technology object module 160 (FIG. 7). Neighbor list object 222 represents those channels that are shared between neighboring cells or sectors for a particular technology type employed in radio communications network 20 (FIG. 1).

In response to task 220, a task 224 is performed to link neighbor list object 222 to the particular technology object 192 with which it is associated. Pointers are provided by each of technology plane class 162 (FIGS. 14a–14b) and neighbor list class 168 (FIG. 17) to link neighbor list object 222 to technology object 192. For example, a pointer 226 linking neighbor list object 222 to AMPS TRAFFIC technology object 192 is diagrammatically represented in hierarchical data structure 136.

Only one neighbor list object 222 is shown for clarity of illustration in FIG. 21. However, it should be understood that each of AMPS CONTROL, CDMA, or other technology objects 192 may have associated therewith, a neighbor list object 222 for the particular technology type.

Following task 224 a query task 228 is performed. Alternatively, when no neighbors list is received at query task 218, query task 228 is performed. At query task 228, processor 118 (FIG. 7) determines if radio communications network 20 (FIG. 1) includes another technology type to be characterized. When another technology type exists, for example AMPS TRAFFIC CDMA, TDMA, or dual mode, program control loops back to task 188 and subprocess 186 is repeated for the next communication technology type.

When all of the communication technology types have been characterized and are added to hierarchical data structure 136, subprocess 186 exits. Accordingly, following subprocess 186, the communication technology types employed in network 20 (FIG. 1) and associated auxiliary information in the form of constraint matrix object 202, C/I matrix object 212, and/or neighbor list object 222 in included in hierarchical data structure 136. The absence of constraint matrix object 202, C/I matrix object 212, and/or neighbor list object 222 does not prevent the network planner from making channel assignments. However, the inclusion of objects 202, 212, and/or 222 associated with their communication technology types in hierarchical data structure 136 advantageously provide auxiliary information for more effectively and efficiently making channel assignments.

With reference back to process 178 (FIG. 20), following the execution of technology definition subprocess 186, program control proceeds to a channel availability subprocess 230.

Figure 23:
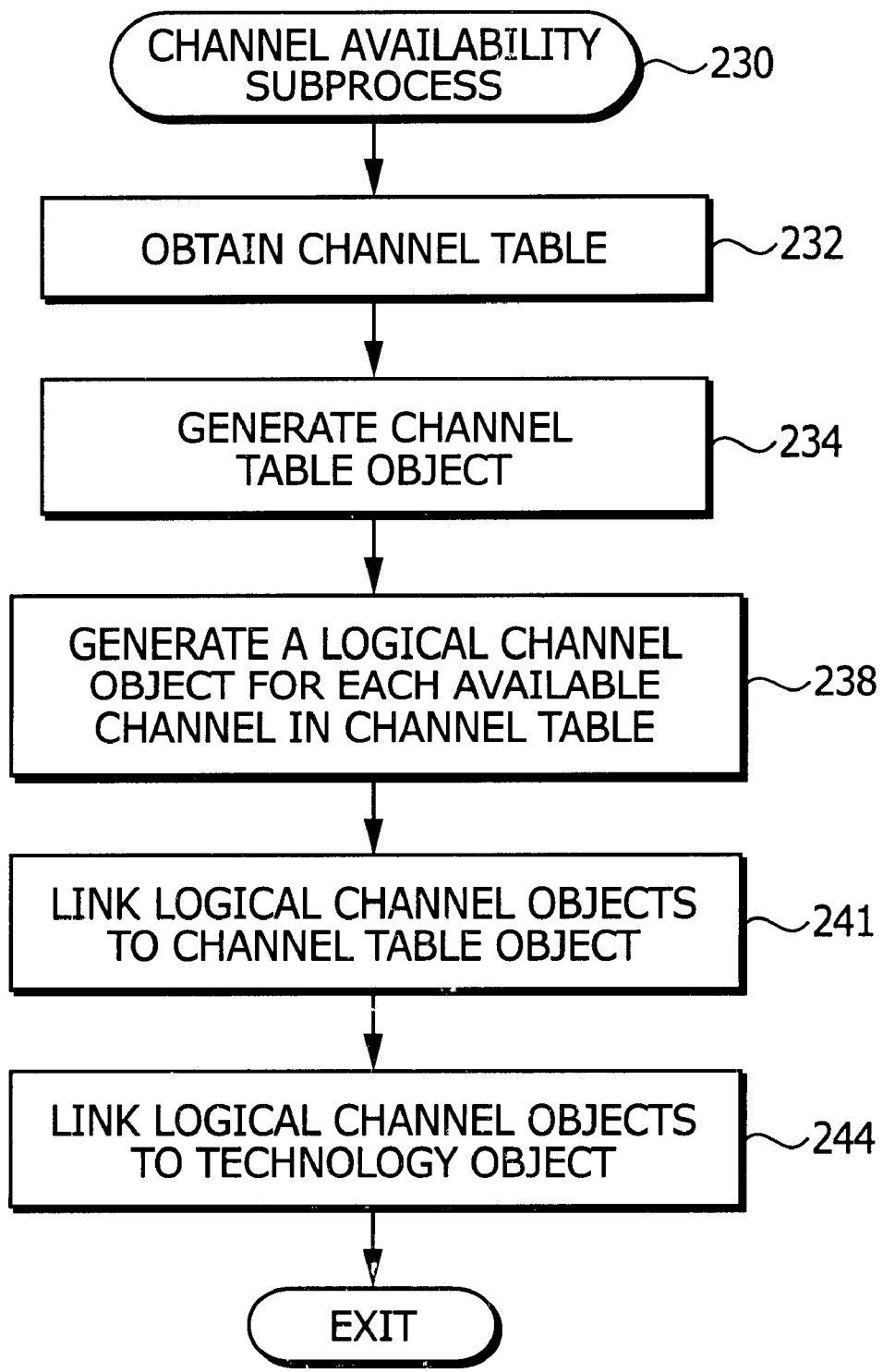
FIG. 23 shows a flow chart of an exemplary channel availability subprocess.

Referring to FIGS. 21 and 23, FIG. 23 shows a flow chart of channel availability subprocess 230. Subprocess 230 is performed through the execution of channel table acquisition module 170 (FIG. 7) and channel table object module 172 (FIG. 7) of executable code 134 (FIG. 7). Subprocess 230 identifies those communication channels available for assignment in radio communications network 20 (FIG. 1). Subprocess 230 begins with a task 232.

At task 232, processor 118 (FIG. 7) obtains a channel table. The channel table may be included in radio communications network configuration database 128 (FIG. 7). Alternatively, the channel table may be an adjunct to data base 128 or the channel table may be created by, or transferred through, processor 118. The channel table is simply a listing of channels available to network 20. Following acquisition of the channel table at task 232, a task 234 is performed.

At task 234, processor 118 (FIG. 7) generates a channel table object 236 (FIG. 21) using channel table class 174 (FIG. 18) of channel table object module 172 (FIG. 7). Channel table object 236 represents those channels that are available for assignment to a particular technology type in radio communications network 20 (FIG. 1).

A task 238 is performed in combination with task 234. At task 238, processor 118 (FIG. 7) generates logical channel objects 240 (FIG. 21) using channel class 176 (FIG. 19) of channel table object module 172 (FIG. 7). Each logical channel object 240 represents one available channel in the channel table, represented by channel object 236. Each logical channel object 240 includes a label that indicates the communication channel and functions that indicate relationships. For example, a first logical channel object 240' may include a label of the channel number "329". Examples of relationships are adjacency and channel spacing.

In response to tasks 234 and 238, a task 241 is performed to link logical channel objects 240 to channel table object 236. Pointers are provided by each of channel table class 174 (FIG. 18) and channel class 176 (FIG. 19) to link logical channel objects 240 to channel table object 236. For example, pointers 242 linking logical channel objects 240 to channel table object 236 are diagrammatically represented in hierarchical data structure 136.

Following task 241, a task 244 is performed to link logical channel objects 240 to the particular technology object 192 with which it is associated. For example, logical channels 313-254 are reserved as AMPS control channels and logical channels 1-312 and 355-666 are reserved as AMPS traffic channels. Pointers are provided by each of technology plane class 162 (FIGS. 14a–14b) and channel class 176 (FIG. 19) to link logical channel objects 240 to technology object 192. For example, a pointer 244 linking logical channel object 240, labeled "329", to AMPS CONTROL technology object 192 is diagrammatically represented in hierarchical data structure 136. Likewise, pointers 246 linking logical channel objects 240, labeled "493" and "492", to AMPS TRAFFIC technology object 192 are diagrammatically represented in hierarchical data structure 136.

Only three of logical channel object 240 are shown for clarity of illustration. However, it should be understood that there may be many more communication channels available for assignment. Alternatively, if radio communications network 20 (FIG. 1) has no available communication channels, there may be no logical channel objects 240 linked to channel table 236. Following task 244, channel availability subprocess 230 exits.

With reference back to network modeling process 178 (FIG. 20), following the execution of channel availability subprocess 230, program control proceeds to a task 248. At task 248, processor 118 (FIG. 7) selects the next one of cell site configurations 129 (FIG. 7) from radio communication network configuration database 128 (FIG. 7). For example, processor 118 may select first cell site configuration 36 (FIG. 7) of database 128 (FIG. 7) at task 248. Of course, during a first iteration of task 248, the "next" cell site configuration will the first cell site configuration of network 20 to be characterized.

Following task 248, a task 250 is performed. At task 250, processor 118 identifies the next base station in the selected cell site configuration 129. For example, in first cell site configuration, base station controller 38 (FIG. 2) is distinguished.

Referring to hierarchical data structure 136 (FIG. 21) in connection with process 178, a task 252 is performed in response to task 250. At task 252, processor 118 creates a site object 254 (FIG. 21) using base station class 148 (FIG. 9) of distinct object module 140 (FIG. 7). Site object 254 represents the base station in a particular one of cell site configurations 129 (FIG. 7) in radio communications network 20 (FIG. 1).

In response to task 252, a task 256 is performed to link site object 254 to radio plan object 184. Pointers are provided by each of base station class 148 (FIGS. 9) and radio plan class 142 (FIG. 8) to link site object 254 to radio plan object 184. For example, pointers 258 linking site objects 254, labeled "SITE 1" and "SITE M", to radio plan object 184 are diagrammatically represented in hierarchical data structure 136.

Only two site objects 254 are shown for clarity of illustration in FIG. 21. However, it should be understood that radio communications network 20 (FIG. 1) will have a base station controller associated with each cell site. Furthermore, network 20 will encompass any number of cell sites, six of which are shown in FIG. 1.

Figure 24A:
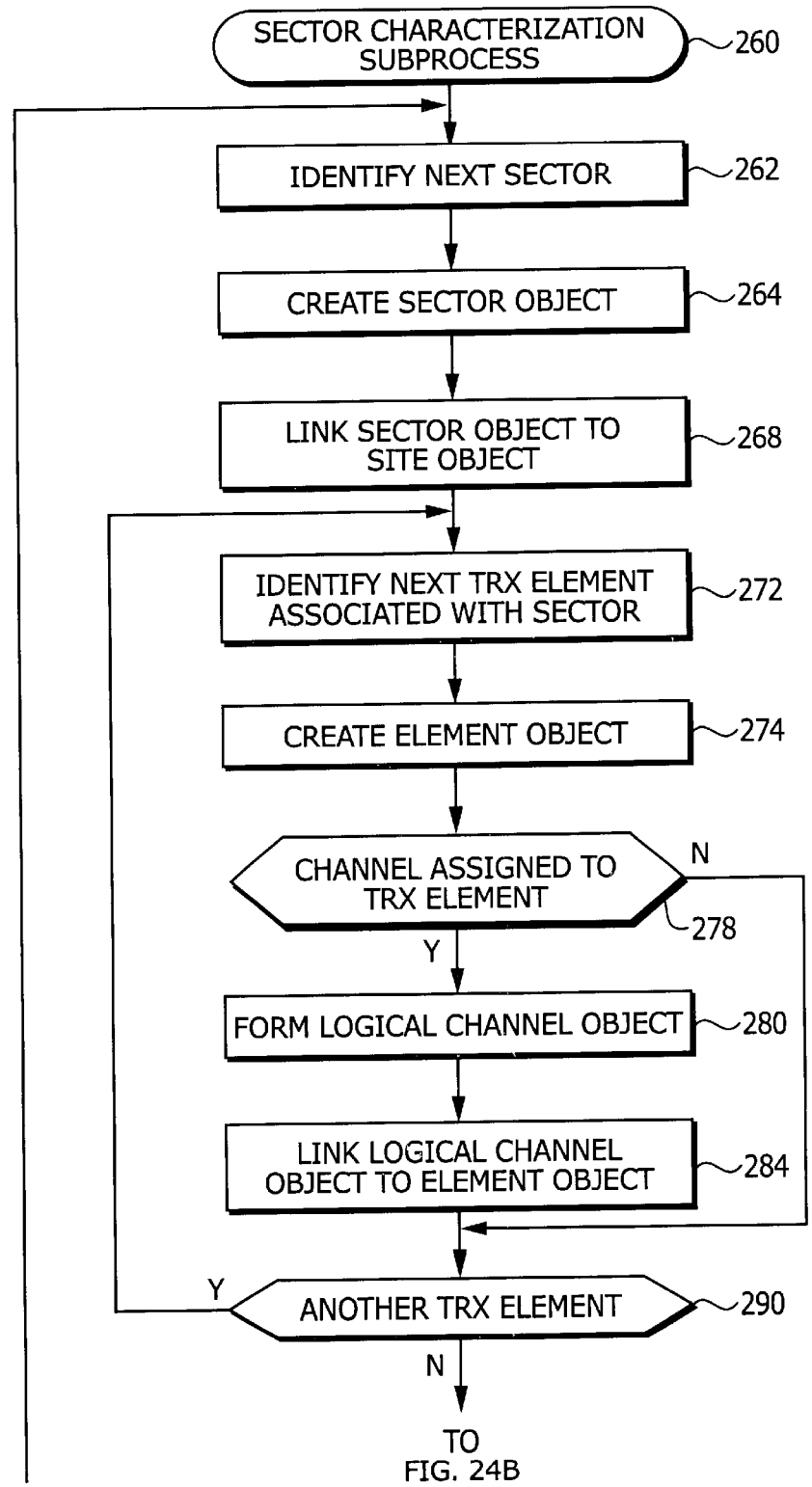
FIG. 24 shows a flow chart of an exemplary sector characterization subprocess.
Figure 24B:
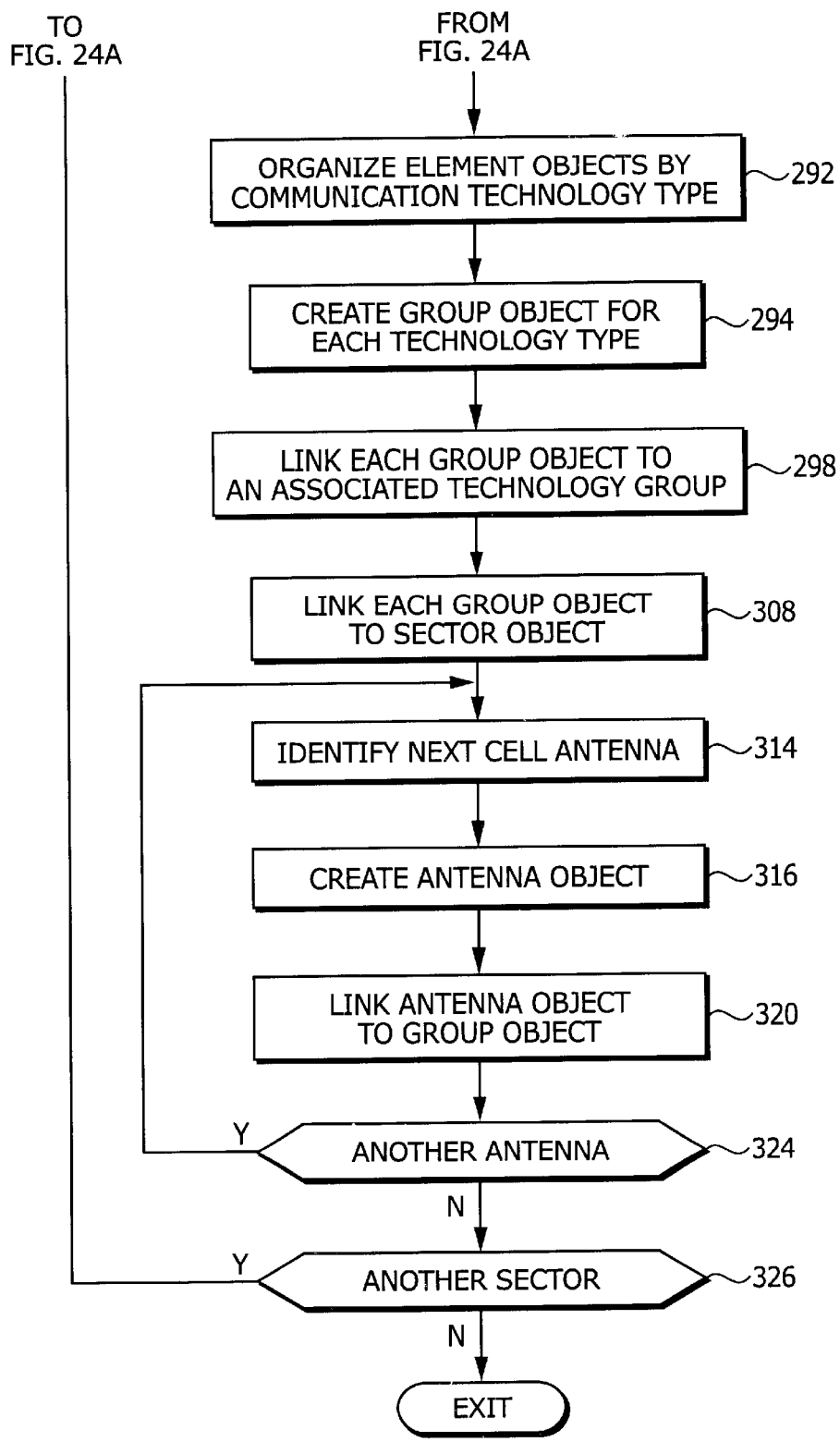

Following task 256, a sector characterization subprocess 260 is performed. Referring to FIG. 24, in connection with hierarchical data structure 136 (FIG. 21), FIG. 24 shows a flow chart of sector characterization subprocess 260. Subprocess 260 is performed through the execution of cell site constituent identification module 138 (FIG. 7) and distinct object module 140 (FIG. 7) of executable code 134 (FIG. 7). Subprocess 260 characterizes the cell site constituents that along with the selected base station controller form the selected one of cell site configurations 129 (FIG. 7) in radio communications network 20.

Subprocess 260 begins with a task 262. At task 262, processor 118 (FIG. 7) identifies the next sector in the selected cell site configuration 129. For example, in fifth cell site configuration 88 (FIG. 6), first sector controller 92 (FIG. 6) is distinguished. Of course, during a first iteration of task 262, the "next" sector will the first sector in the selected cell site configuration of network 20 to be characterized.

Referring to hierarchical data structure 136 (FIG. 21) in connection with subprocess 260, a task 264 is performed in response to task 262. At task 264, processor 118 creates a sector object 266 using sector class 150 (FIG. 10) of distinct object module 140 (FIG. 7). Sector object 266 represents a sector controller, such as first, second, and third sector controllers 92, 94, and 96, in a particular one of cell site configurations 129 (FIG. 7) in radio communications network 20 (FIG. 1).

In response to task 264, a task 268 is performed to link sector object 266 to its associated site object 254. Pointers are provided by each of sector class 150 (FIG. 10) and base station class 148 (FIGS. 9) to link sector object 266 to its associated site object 254. For example, pointers 270 linking sector objects 266, labeled "SECTOR 1" and "SECTOR N", to site object 254, labeled "SITE 1" are diagrammatically represented in hierarchical data structure 136. Likewise, pointers 272 linking sector objects 266, labeled "SECTOR 1" and "SECTOR N", to site object 254, labeled "SITE M" are diagrammatically represented in hierarchical data structure 136.

Multiple sector objects 266 linked to each site object 254 indicates sectored cells. An unsectored cell may be represented utilizing a single sector object 266 linked to its associated site object 254. Only four of sector objects 266 are shown for clarity of illustration. However, it should be understood that radio communications network 20 (FIG. 1) may have a number of sector objects associated with each site object 254.

Following task 268, a task 272 is performed. At task 272, processor 118 (FIG. 7) identifies the next transmit/receive element associated with a sector. For example, in fifth cell site configuration 88 (FIG. 6), a first one of transmit/receive elements 100 (FIG. 6) associated with first sector controller 92 (FIG. 6) is distinguished. Of course, during a first iteration of task 272, the "next" transmit/receive element will the first transmit/receive element to be modeled in the sector identified in task 262.

A task 274 is performed in response to task 272. At task 274, processor 118 creates an element object 276 using transmit/receive element class 154 (FIGS. 12a–12b) of distinct object module 140 (FIG. 7). Element object 276 represents one transmit/receive element at a particular one of cell site configurations 129 (FIG. 7) in radio communications network 20 (FIG. 1).

A query task 278 is performed in connection with task 274. At task 274, processor 118 analyzes network configuration database 128 (FIG. 7) to determine if a communication channel is assigned to the identified transmit/receive element. A communication channel may be previously assigned to the identified transmit/receive element in a brownfield network configuration in which there is preexisting legacy material, such as equipment, architectures, procedures, assigned communication channels, and so forth. When a communication channel has been previously assigned to the transmit/receive element, subprocess 260 proceeds to a task 280.

At task 280, processor 118 creates a logical channel object 282 using channel class 176 (FIG. 19) of channel table object module 172 (FIG. 7). Logical channel object 282 represents the communication channel assigned to a particular one of the transmit/receive elements. Logical channel object 82 includes a label that indicates the assigned communication channel. For example, a first logical channel object 282' includes a label of the channel number "690".

Following task 280, a task 284 is performed. At task 284, processor 118 (FIG. 7) is performed to link logical channel object 282 to its associated element object 276. Pointers are provided by each of channel class 179 (FIG. 19) and transmit/receive element class 154 (FIGS. 12a–12b) to link logical channel object 282 to its associated element object 276.

Accordingly, there is a one to one relationship between element objects 276 and logical channel objects 282. For example, a pointer 286 linking logical channel object 282, labeled "690", to element object 276, labeled "TRX a" is diagrammatically represented in hierarchical data structure 136. Likewise, a pointer 288 linking logical channel object 282, labeled "551", to element object 276, labeled "TRX b" is diagrammatically represented in hierarchical data structure 136.

Following task 284, a query task 290 is performed. Alternatively, when query task 278 determines that a communication channel is not assigned to the identified transmit/receive element program control proceeds to query task 290.

At query task 290, processor 118 (FIG. 7) determines if there is another transmit/receive element associated with the sector identified in task 262 to be modeled. For example, referring momentarily to fifth cell site configuration 88 (FIG. 6), first set 98 includes a number of transmit/receive elements 100, as indicated by TRXa, TRXb, TRXn, and the intervening ellipsis ( . . . ). When query task 290 determines that there is another transmit/receive element, subprocess 260 loops back to task 272 to identify the next transmit/receive element, form an element object 276 at task 274, and form a logical channel object 282 in response to an assigned channel at task 280.

However, when query task 290 determines that there is not another one of the transmit/receive elements associated with the identified sector, subprocess 260 proceeds to a task 292.

At task 292, processor 118 (FIG. 7) organizes each of element objects 276 for an identified sector according to the communication technology type with which it is associated. For example, a group of transmit/receive elements may be designated for AMPS CONTROL, another group of transmit/receive elements may be designated for AMPS TRAFFIC, and yet another group of transmit/receive elements may be designated for CDMA communication. Task 292 organizes element objects 276 into their respective communication technology types.

Following task 292, a task 294 is performed. At task 294, processor 118 creates a group object 296 using transmit/receive group class 152 (FIGS. 11a–11b) of distinct object module 140 (FIG. 7). Group object 296 represents a logical construct of the transmit/receive elements in a particular one of cell site configurations 129 (FIG. 7) each of which utilize a common technology type.

In response task 294, a task 298 is performed to link each group object 296 to an associated one of technology types 192. Pointers are provided by each of transmit/receive group class 152 (FIGS. 11a–11b) and technology plane class 162 (FIGS. 14a–14b) to link each group object 296 to its associated technology object 192.

For example, a pointer 300 linking group object 296, labeled "TRX GROUP A" to AMPS TRAFFIC technology object 192, is diagrammatically represented in hierarchical data structure 136. Likewise, a pointer 302 linking group object 296, labeled "TRX GROUP B1" to AMPS CONTROL technology object 192, a pointer 304 linking group object 296, labeled "TRX GROUP B2" to AMPS TRAFFIC technology object 192, and a pointer 306 linking group object 296, labeled "TRX GROUP C" to CDMA technology object 192 are diagrammatically represented in hierarchical data structure 136.

Following task 298, a task 308 is performed to link each group object 296 to its associated sector object 266. Pointers are provided by each of transmit/receive group class 152 (FIGS. 11a–11b) and sector class 150 (FIG. 10) to link each group object 296 to its associated sector object 266. For example, a pointer 310 linking group object 296, labeled "TRX GROUP A", to sector object 266, labeled "SECTOR 1" is diagrammatically represented in hierarchical data structure 136. Likewise, pointers 312 linking group objections 296, labeled "TRX GROUP B1", "TRX GROUP B2", and "TRX GROUP C" to sector object 266 labeled "SECTOR" are also diagrammatically represented in hierarchical data structure 136.

Following task 308, a task 314 is performed. At task 314, processor 118 (FIG. 7) identifies the next cell antenna in the selected cell site configuration 129. For example, in second cell site configuration 46 (FIG. 3), first cell antenna 58 (FIG. 3) is distinguished. Of course, during a first iteration of task 314, the "next" cell antenna will be the first cell antenna in the selected cell site configuration of network 20 to be modeled.

Referring to hierarchical data structure 136 (FIG. 21) in connection with subprocess 260, a task 316 is performed in response to task 314. At task 316, processor 118 creates an antenna object 318 using antenna class 156 (FIG. 13) of distinct object module 140 (FIG. 7). Antenna object 318 represents a cell antenna, such as one of first and second antennas 58 and 60 (FIG. 3), in a particular one of cell site configurations 129 (FIG. 7) in radio communications network 20 (FIG. 1).

In response to task 316, a task 320 is performed to link antenna object 318 to its associated group object 296. Pointers are provided by each of antenna class 156 (FIG. 13) and transmit/receive group class 152 (FIGS. 11a–11b) to link antenna object 318 to its associated group object 296. For example, pointers 322 linking antenna objects 318, labeled "ANTENNA 1" and "ANTENNA 2", to group object 296, labeled "TRX GROUP A" are diagrammatically represented in hierarchical data structure 136. Only two of antenna objects 318 are shown for clarity of illustration. However, it should be understood that radio communications network 20 (FIG. 1) should have as a minimum one cell antenna per cell site.

Following task 320, a query task 324 is performed. At query task 324, processor 118 determines if the identified sector includes another antenna. A single cell site or sector of a cell site may have more than one cell antenna, as shown in second and fourth cell site configurations 46 and 76, respectively (FIGS. 3 and 5). When there is another cell antenna, program control loops back to task 314 to create antenna object 318 for the next identified cell antenna.

However, when query task 324 determines that there is not another cell antenna associated with the identified sector, subprocess proceeds to a query task 326. At query task 326, processor 118 (FIG. 7) determines if there is another sector associated with the base station originally identified in task 250 of network modeling process 178.

When there is another sector to be modeled, program control loops back to task 262 to model the next sector within the cell site and its associated cell site constituents (i.e., transmit/receive groups, transmit/receive elements, assigned communication channels, and cell antennas). However, when there is not another sector to be modeled, sector characterization subprocess 260 exits.

Referring back to network modeling process 178 (FIG. 20), following an exit from subprocess 260, program control proceeds to a query task 328. At query task 328, processor 118 determines if there is another base station in the selected one of cell site configurations 129 selected in task 248. Such a configuration may arise in a cell in which a second base station is employed as a repeater for a weak area of the cell. Accordingly, when there is another base station in the selected cell site configuration 129, process 178 loops back to task 250 to begin modeling the next base station and its associated cell site constituents.

However, when query task 328 determines that there is not another base station, process 178 proceeds to a query task 330. At task 330, processor 118 determines if there is another cell site configuration 129 (FIG. 7) in radio communications network configuration database 128 (FIG. 7) to be modeled. When there is another cell site configuration 129, process 178 loops back to task 248 to select the next one of cell site configurations 129.

However, when there is not another one of cell site configurations 129, process 178 exits. The resulting hierarchical data structure, such as the exemplary hierarchical data structure 136 (FIG. 21) is employed for subsequent frequency planning, making interference calculations, providing performance and regulatory reports, modeling network performance, and so forth. If not previously configured, network 20 may also be configured as described in data structure 136 to achieve actual results corresponding to the frequency planning, interference calculations, etc. determined using data structure 136.

In summary, a method and system for modeling a radio communications network has been described. A hierarchical data structure that models the radio communications network is readily created by implementing an object oriented programming environment for creating objects from object classes representative of cell site constituents and linking the objects to represent any number of different cell site configurations employed by the radio communications network. The utilization of object classes to create objects representative of a given cell site configuration and the subsequent linking decreases development time and lowers overall development costs when modeling radio communications networks. Moreover, the programming environment allows the hierarchical data structure to be modified in a cost effective manner since the object class code can be invoke for creating a new object or rearranging the structure and linking of pre-existing objects. In addition, the method and system associate related frequency planning information, such as channel assignment constraints, carrier-to-interference ratios, and neighbor lists with the radio communications network for effective frequency planning.

Although the preferred embodiments of the invention have been illustrated and described in detail, it will be readily apparent to those skilled in the art that various modifications may be made therein without departing from the spirit of the invention or from the scope of the appended claims. For example, the tasks described herein may be performed in a different order.

What is claimed is:

1. A computer-readable storage medium containing executable code for instructing a computer to create a data structure modeling a radio communications network, said radio communications network having a plurality of cell sites, said executable code instructing said computer to perform operations comprising:

receiving a network configuration for said radio communications network;

identifying, in response to said network configuration, cell site constituents of one of said cell sites in said radio communications network;

creating distinct objects to represent each of said cell site constituents; and linking each of said distinct objects according to a cell site configuration of said one cell site.

2. A computer-readable storage medium as claimed in claim 1 wherein:

said identifying operation distinguishes a first one of said cell site constituents as a base station;

said creating operation forms a site object to represent said base station; and said linking operation provides a pointer between said site object and a radio plan object identifying said radio communications network.

3. A computer-readable storage medium as claimed in claim 1 wherein:

said identifying operation distinguishes a first one of said cell site constituents as a base station and a second one of said cell site constituents as a sector;

said creating operation forms a site object to represent said base station and a sector object to represent said sector; and said linking operation provides a pointer between said sector object and said site object.

4. A computer-readable storage medium as claimed in claim 3 wherein:

said identifying operation further distinguishes a third one of said cell site constituents as a second sector;

said creating operation forms a second sector object to represent said second sector; and said linking operation further provides a second pointer between said second sector object and said site object.

5. A computer-readable storage medium as claimed in claim 1 wherein:

said identifying operation distinguishes a first one of said cell site constituents as a sector and a second one of said cell site constituents as a transmit/receive group, said transmit/receive group forming a logical construct of transmit/receive elements at said cell site;

said creating operation forms a sector object to represent said sector and a group object to represent said transmit/receive group; and said linking operation provides a pointer between said group object and said sector object.

6. A computer-readable storage medium as claimed in claim 5 wherein:

said identifying operation further distinguishes a third one of said cell site constituents as a second transmit/receive group forming a second logical construct of said transmit/receive elements at said cell site; and said creating operation forms a second group object to represent said second transmit/receive group; and said linking operation further provides a second pointer between said second group object and said sector object.

7. A computer-readable storage medium as claimed in claim 5 wherein each of said transmit/receive elements utilizes a common technology type selected from a group consisting of advanced mobile phone service (AMPS) control, AMPS traffic, code division multiple access (CDMA), dual mode, and time division multiple access (TDMA) technology types.

8. A computer-readable storage medium as claimed in claim 1 wherein:

said identifying operation distinguishes ones of said cell site constituents as transmit/receive elements and organizes said transmit/receive elements into transmit/receive groups, each of said transmit/receive groups forming a logical construct of said transmit/receive elements at said cell site each of which utilize a common technology type;

said creating operation forms element objects, one each of said element objects representing one each of said transmit/receive elements and forms group objects, one each of said group objects representing one each of said transmit/receive groups; and said linking operation provides a pointer between each of said element objects utilizing said common technology type and one of said group objects representing said common technology type.

9. A computer-readable storage medium as claimed in claim 1 wherein:

said identifying operation distinguishes ones of said cell site constituents as transmit/receive elements and others of said cell site constituents as channels;

said creating operation forms an element object for each of said transmit/receive elements and a channel object for each of said channels; and said linking operation provides a pointer between associated ones of said element objects and said channel objects.

10. A computer-readable storage medium as claimed in claim 1 wherein:

said identifying operation distinguishes a first one of said cell site constituents as a transmit/receive group, said transmit/receive group forming a logical construct of transmit/receive elements at said cell site, and distinguishes a second one of said cell site constituents as an antenna;

said creating operation forms a group object to represent said transmit/receive group and an antenna object to represent said antenna; and said linking operation provides a pointer between said antenna object and said group object.

11. A computer-readable storage medium as claimed in claim 1 wherein:

said identifying operation further distinguishes a third one of said cell site constituents as a second antenna;

said creating operation forms a second antenna object to represent said second antenna; and said linking operation further provides a second pointer between said second antenna object and said group object.

12. A computer-readable storage medium as claimed in claim 1 wherein:

said executable code instructs said computer to perform further operations comprising:
defining communication technology types employed in said radio communications network; and
forming technology objects, one each of said technology objects representing one each of said communication technology types;

said identifying operation distinguishes one of said cell site constituents as a transmit/receive group, said transmit/receive group forming a logical construct of transmit/receive elements at said cell site each of which utilize one of said communication technology types;

said creating operation forms a group object to represent said transmit/receive group; and said linking operation provides a pointer between said group object and one of said technology objects representing said one of said communication technology types.

13. A computer-readable storage medium as claimed in claim 12 wherein:

said defining operation receives constraint matrices for associated ones of said communication technology types;

said forming operation generates constraint matrix objects to represent said received constraint matrices; and said linking operation further provides second pointers between said constraint matrix objects and associated ones of said technology objects.

14. A computer-readable storage medium as claimed in claim 12 wherein:

said defining operation receives carrier-to-interference (C/I) matrices for associated ones of said technology categories;

said forming operation generates C/I matrix objects to represent said received C/I matrices; and said linking operation further provides second pointers between said C/I matrix objects and associated ones of said technology objects.

15. A computer-readable storage medium as claimed in claim 12 wherein:

said defining operation receives neighbor matrices for associated ones of said technology categories;

said forming operation generates neighbor matrix objects to represent said received neighbor matrices; and said linking operation further provides second pointers between said neighbor matrix objects and associated ones of said technology objects.

16. A computer-readable storage medium as claimed in claim 1 wherein:

said executable code instructs said computer to perform further operations comprising:
receiving a channel table for said radio communications network, said channel table encompassing communication channels available for assignment in said radio communications network; and
forming a channel table object to represent at least a portion of said channel table; and said linking operation provides a first pointer between said channel table object and a radio plan object identifying said radio communications network.

17. A computer-readable storage medium as claimed in claim 16 wherein:

said forming operation forms a distinct channel object for each of said available communication channels; and said linking operation provides second pointers between each of said distinct channel objects and said channel table object.

18. A computer-readable storage medium as claimed in claim 1 wherein:

said identifying operation distinguishes ones of said cell site constituents as sectors;

said creating operation forms a sector object for each of said sectors; and said linking operation provides second pointers between said channel table object and each of said sector objects.

19. A computer-readable storage medium as claimed in claim 1 wherein said executable code further instructs said computer to perform said identifying, creating, and linking operations for each of said cell sites to create said data structure.

20. A computer-readable storage medium as claimed in claim 1 wherein said executable code includes channel assignment instructions for assigning communication channels in response to said data structure such that radio communications in said radio communications network are conducted at said cell sites in accordance with said assigned communication channels.

21. A computer-based method for creating a hierarchical data structure modeling a radio communications network having a plurality of cell sites, said method comprising:

receiving a network configuration for said radio communications network;

identifying, in response to said network configuration, cell site constituents of one of said cell sites;

creating distinct objects to represent each of said cell site constituents;

defining communication technology types employed in said radio communications network;

forming technology objects, one each of said technology objects representing one each of said communication technology types;

obtaining a channel table for said radio communications network, said channel table encompassing communication channels available for assignment in said radio communications network;

generating at least one channel table object to represent said channel table;

linking said distinct objects according to a cell site configuration of said one cell site; and associating said technology objects and said channel table object with said distinct objects.

22. A computer-based method as claimed in claim 21 wherein:

said identifying operation includes distinguishing a first one of said cell site constituents as a base station and a second one of said cell site constituents as a sector;

said creating operation includes forming a site object to represent said base station and a sector object to represent said sector, said site object and said sector object forming ones of said distinct objects; and said linking operation includes providing a pointer between said sector object and said site object.

23. A computer-based method as claimed in claim 22 wherein said associating operation includes providing a second pointer between said channel table object and said sector object.

24. A computer-based method as claimed in claim 22 wherein:
said identifying operation further includes:
distinguishing ones of said cell site constituents as transmit/receive elements; and
organizing said transmit/receive elements into transmit/receive groups, each of said transmit/receive groups forming a logical construct of said transmit/receive elements at said cell site each of which utilize a common one of said communication technology types;
said creating operation includes forming element objects, one each of said element objects representing one each of said transmit/receive elements, and forming group objects, one each of said group objects representing one each of said transmit/receive groups; and
said linking operation includes providing second pointers between each of said element objects utilizing said common one of said technology types and one of said group objects representing said common one of said technology types.

25. A computer-based method as claimed in claim 24 wherein said associating operation includes providing a third pointer between said one of said group objects and one of said technology objects representing said common one of said technology types.

26. A computer-based method as claimed in claim 22 wherein:
said identifying operation further includes:
distinguishing a third one of said cell site constituents as a transmit/receive group, said transmitter receiver group forming a logical construct of transmit/receive elements at said cell site each of which utilize a common one of said technology types; and
distinguishing a fourth one of said cell site constituents as an antenna;
said creating operation includes forming a group object to represent said transmit/receive group and an antenna object to represent said antenna; and
said linking operation includes providing a pointer between said antenna object and said transmit/receive group.

27. A computer-based method as claimed in claim 21 further comprising:
receiving constraint matrices associated with respective ones of said communication technology types employed in said radio communications network;
generating constraint matrix objects to represent said received constraint matrices; and
said associating operation includes providing a pointer between each of said technology objects and an associated one of said constraint matrix objects.

28. A computer-based method as claimed in claim 21 further comprising:
receiving carrier-to-interference (C/I) ratio matrices associated with respective ones of said communication technology types employed in said radio communications network;
generating C/I matrix objects to represent said received C/I ratio matrices; and said associating operation includes providing pointers between each of said technology objects and an associated one of said C/I matrix objects.

29. A computer-based method as claimed in claim 21 wherein:
said identifying operation includes distinguishing ones of said cell site constituents as sectors;
said creating operation includes forming a sector object for each of said sectors; and
said associating operation includes providing pointers between said channel table object and each of said sector objects.

30. A computer-based method as claimed in claim 21 further comprising:
repeating said identifying, creating, linking, and associating steps for each of said cell sites in said radio communications network to create said hierarchical data structure; and
assigning said communication channels in response to said hierarchical data structure such that radio communications in said radio communications network are conducted at said cell sites in accordance with said assigned communication channels.

31. A computer-based method as claimed in claim 21 wherein a computer-readable storage medium has stored therein instructions capable of causing a computer to perform said computer-based method.

32. A computing system for configuring a hierarchical data structure modeling a radio communications network comprising:
a processor;
a computer-readable storage medium; and
executable code recorded on said computer-readable storage medium for instructing said processor to create said hierarchical data structure, said executable code including:
a cell site constituent identification module for identifying cell site constituents of a cell site in said radio communications network;
a distinct object module having cell site classes, each of said cell site classes containing instructions for creating a distinct object representing one of said cell site constituents;
a communication technology type definition module for defining communication technology types employed in said radio communication network;
a technology object module having technology type classes, each of said technology type classes containing instructions for creating technology objects representing said communication technology types;
a channel table acquisition module for obtaining communication channels available for assignment in said radio communications network;
a channel table object module having a channel table class containing instructions for generating a channel table object to represent said available communication channels and a channel class containing instructions for generating logical channel objects for each of a plurality of logical communication channels;
an object linking module having instructions for linking said distinct objects in accordance with a cell site configuration of said cell site; and
an object association module for associating said technology objects, said channel table object, and said logical channel objects with said distinct objects.

33. A computer system as claimed in claim 32 wherein said cell site classes includes:

a base station class for creating a site object;

a sector class for creating a sector object;

a transmit/receive group class for creating a group object;

a transmit/receive element class for creating an element object; and an antenna class for creating an antenna object.

34. A computer system as claimed in claim 33 wherein said object linking module includes:

a first instruction set for linking said site object to a radio plan object identifying said radio communication network;

a second instruction set for linking said sector object to said site object;

a third instruction set for linking said group object to said sector object;

a fourth instruction set for linking said element object to said group object; and a fifth instruction set for linking said antenna object to said group object.

35. A computer system as claimed in claim 34 wherein said object association module includes a sixth instruction set for associating said group object with said technology object.

36. A computer system as claimed in claim 34 wherein said object association module includes a sixth instruction set for linking one of said logical channel objects to said element object to represent a logical communication channel assigned to said transmit/receive element represented by said element object.

37. A computer system as claimed in claim 32 wherein said object association module includes an instruction set for linking said logical channel objects, each of which represent those of said logical communication channels currently available for assignment, to said channel table object.

38. A computer system as claimed in claim 32 wherein said technology object module further includes:

a constraint class for creating a constraint matrix object for each of said technology objects;

a C/I matrix class for creating a C/I matrix object for said each of said technology objects; and an instruction set for linking one of said constraint matrix objects and one of said C/I matrix objects to an associated one of said technology objects.

* * * * *